United States Patent
Sebastian et al.

(10) Patent No.: US 10,134,178 B2
(45) Date of Patent: Nov. 20, 2018

(54) FOUR-DIMENSIONAL PATH-ADAPTIVE ANCHORING FOR IMMERSIVE VIRTUAL VISUALIZATION SYSTEMS

(71) Applicant: Visual Music Systems, Inc., Boston, MA (US)

(72) Inventors: William B. Sebastian, Falmouth, MA (US); Robert Eastwood, Halifax (CA)

(73) Assignee: Visual Music Systems, Inc., Boston, MA (US)

( * ) Notice: Subject to any disclaimer, the term of this patent is extended or adjusted under 35 U.S.C. 154(b) by 64 days.

(21) Appl. No.: 15/282,864

(22) Filed: Sep. 30, 2016

(65) Prior Publication Data

US 2017/0091983 A1   Mar. 30, 2017

Related U.S. Application Data

(60) Provisional application No. 62/235,189, filed on Sep. 30, 2015.

(51) Int. Cl.

| | |
|---|---|
| *G06T 13/20* | (2011.01) |
| *G06T 15/20* | (2011.01) |
| *G10H 1/00* | (2006.01) |
| *G06T 1/20* | (2006.01) |
| *G06T 1/60* | (2006.01) |
| *G06F 3/0346* | (2013.01) |

(52) U.S. Cl.
CPC .......... *G06T 15/205* (2013.01); *G06F 3/0346* (2013.01); *G06T 1/20* (2013.01); *G06T 1/60* (2013.01); *G06T 13/205* (2013.01); *G10H 1/0008* (2013.01); *G06T 2200/04* (2013.01); *G06T 2210/56* (2013.01); *G10H 2220/101* (2013.01)

(58) Field of Classification Search
USPC ........................................................ 345/419
See application file for complete search history.

(56) References Cited

U.S. PATENT DOCUMENTS

| | | |
|---|---|---|
| 9,389,684 B2 | 7/2016 | Sebastian |
| 2004/0069125 A1 | 4/2004 | Ludwig |

(Continued)

OTHER PUBLICATIONS

U.S. Appl. No. 15/282,900, filed Sep. 30, 2016, received a Non-Final Office Action dated Jan. 31, 2018, 22 pages.

*Primary Examiner* — Kimbinh T Nguyen

(74) *Attorney, Agent, or Firm* — Kilpatrick Townsend & Stockton LLP

(57) ABSTRACT

Embodiments include systems and methods for synthesizing, recording, performing and playing back visual music for virtual immersive video playback environments. Virtual music (VM) compositions can include 3D VM instruments, which can be controlled in a highly dynamic and expressive manner using human interface controllers. Some embodiments include novel techniques for controlling, synthesizing, and rendering VM instruments having complex particle system architectures. Some embodiments further provide VM compositional techniques built on four-dimensional modeling constructs that include path-adaptive coordinate systems that define a compositional space-time for modeling, and path-anchored object locators that place objects in the compositional space-time.

21 Claims, 17 Drawing Sheets
(2 of 17 Drawing Sheet(s) Filed in Color)

(56) References Cited

U.S. PATENT DOCUMENTS

| | | |
|---|---|---|
| 2004/0118268 A1 | 6/2004 | Ludwig |
| 2006/0181537 A1* | 8/2006 | Vasan .................... G06L 13/20 |
| | | 345/473 |
| 2008/0071136 A1 | 3/2008 | Oohashi |
| 2009/0237564 A1* | 9/2009 | Kikinis ............. H04N 13/0296 |
| | | 348/584 |
| 2011/0191674 A1 | 8/2011 | Rawley |
| 2013/0238778 A1* | 9/2013 | Reitan .................... H04L 41/00 |
| | | 709/223 |
| 2013/0249948 A1* | 9/2013 | Reitan .................... G06F 3/011 |
| | | 345/633 |
| 2014/0000440 A1 | 1/2014 | Georges |
| 2015/0268926 A1 | 9/2015 | Panaiotis |
| 2016/0150340 A1* | 5/2016 | Seligmann ............ H04R 27/00 |
| | | 381/1 |
| 2016/0191893 A1* | 6/2016 | Gewickey ........... H04N 13/025 |
| | | 386/223 |
| 2017/0092008 A1* | 3/2017 | Djorgovski ........... G06T 19/006 |
| 2017/0193688 A1* | 7/2017 | Djorgovski ........... G06T 15/205 |
| 2017/0244948 A1* | 8/2017 | Pang .................. H04N 13/0014 |
| 2018/0019003 A1* | 1/2018 | Gewickey ............... G11B 27/11 |
| 2018/0020204 A1* | 1/2018 | Pang .................. H04N 13/0014 |
| 2018/0025753 A1* | 1/2018 | Gewickey ........... H04N 13/025 |

* cited by examiner

FOUR-DIMENSIONAL PATH-ADAPTIVE ANCHORING FOR IMMERSIVE VIRTUAL VISUALIZATION SYSTEMS

CROSS-REFERENCE

This application claims the benefit of the filing date of U.S. Provisional Application No. 62/235,189, which has a filing date of Sep. 30, 2015, the entire contents of which is incorporated herein by reference.

FIELD

Embodiments relate generally to virtual immersive video playback environments, and, more particularly, to synthesis of visual music for virtual immersive video playback environments.

BACKGROUND

Consumers of musical art forms have commonly been able to experience a same musical work either in a performer-centric form (e.g., by listening to music while watching its performance), or in a medium-centric form (e.g., by listening to an audio recording separate from the performance); as tied to the musician, or as separable from the musician. Consumers of visual art forms may also experience a work of visual art either as performer-centric or medium-centric. For example, with performer-centric visual art forms, such as dance performances, the art and the artist are linked in the performance (e.g., the performer is the medium). For example, whether experienced live or via a recording, dance as an art form is typically enjoyed by watching movements of one or more dancers, even if in context of stages, sets, lighting, music, etc. With medium-centric visual art forms, such as paintings, sculptures, pottery, movies, etc., a work of art tends to be experienced after the work has been expressed in a tangible medium separable from the artist, such as in canvas, metal, ceramic, film, or the like. For example, a painting is typically experienced by viewing the completed painting, rather than by viewing the painter.

BRIEF SUMMARY

Among other things, embodiments provide novel systems and methods for synthesizing visual music for virtual immersive video playback environments. Some embodiments include techniques for generating visual music (VM) compositions featuring 3D VM instruments that can be played, recorded, and played-back in virtual reality and/or augmented reality video environments. For example, embodiments can be coupled with human interface controllers and/or other input devices with which the VM instruments can be played; and/or embodiments can be coupled with fully or partially immersive headsets, theaters, or other display devices with which VM compositions can be experienced. Some implementations of the VM instruments include complex, playable visual dancers that can be visualized in an immersive three-dimensional video playback environment.

Some implementations include a VM synthesizer coupled with a particle system processor. The VM synthesizer can include a controllable VM instrument construct that has multiple synthesizer control inputs coupled with control module outputs of parameter control modules, including a set of emitter parameter controls and a set of particle parameter controls. The VM synthesizer can also include multiple parameter stack outputs synthesized as a function of the synthesizer control inputs. Each parameter stack output can define a particle system having a respective particle emitter that is defined according to the emitter parameter controls and emits a respective plurality of particles defined according to the particle parameter controls. The particle system processor can include multiple parallel particle engines, each coupled with at least one of the parameter stack outputs, and having a particle supersystem output that characterizes the parameter stack outputs as a polygon definition. The particle system processor can also include a memory manager that is coupled with the particle supersystem output and has a memory layout output indicating assignments of respective portions of the particle definition output to memory blocks of a graphics processor.

Some other implementations include a four-dimensional immersive modeling system that has a four-dimensional (4D) construct data store and a rendering engine. The 4D construct data store and have stored thereon: a path-adaptive coordinate system defined by a sequence of coordinate transform matrices, each stored in association with a respective unique time index associable with a path time basis; and multiple path-anchored object locators, each defining a three-dimensional (3D) position of an associated one of multiple renderable 3D objects at an associated anchor time associable with the path time basis. The rendering engine can be coupled with the 4D construct data store and can have, for each of a sequence of playback frame times: a viewpoint coordinate system ($C_V$) output computed as a function of a frame coordinate system ($C_{PFT}$) defined according to at least one of the sequence of coordinate transform matrices for which the respective unique time index corresponds to the playback frame time; an object set output indicating, for each of a set of the renderable 3D objects, an anchor coordinate system ($C_{AT}$) defined according to the one of the sequence of coordinate transform matrices for which the respective unique time index corresponds to the anchor time of the renderable 3D object; and a rendered frame output including the set of the renderable 3D objects, each rendered in an immersive virtual environment according to a transformed 3D position computed by mapping the 3D position of the renderable 3D object from the $C_{AT}$ to the $C_V$.

BRIEF DESCRIPTION OF THE DRAWINGS

The present disclosure is described in conjunction with the appended figures. The patent or application file contains at least one drawing executed in color. Copies of this patent or patent application publication with color drawings will be provided by the Office upon request and payment of the necessary fee.

Figure 1:
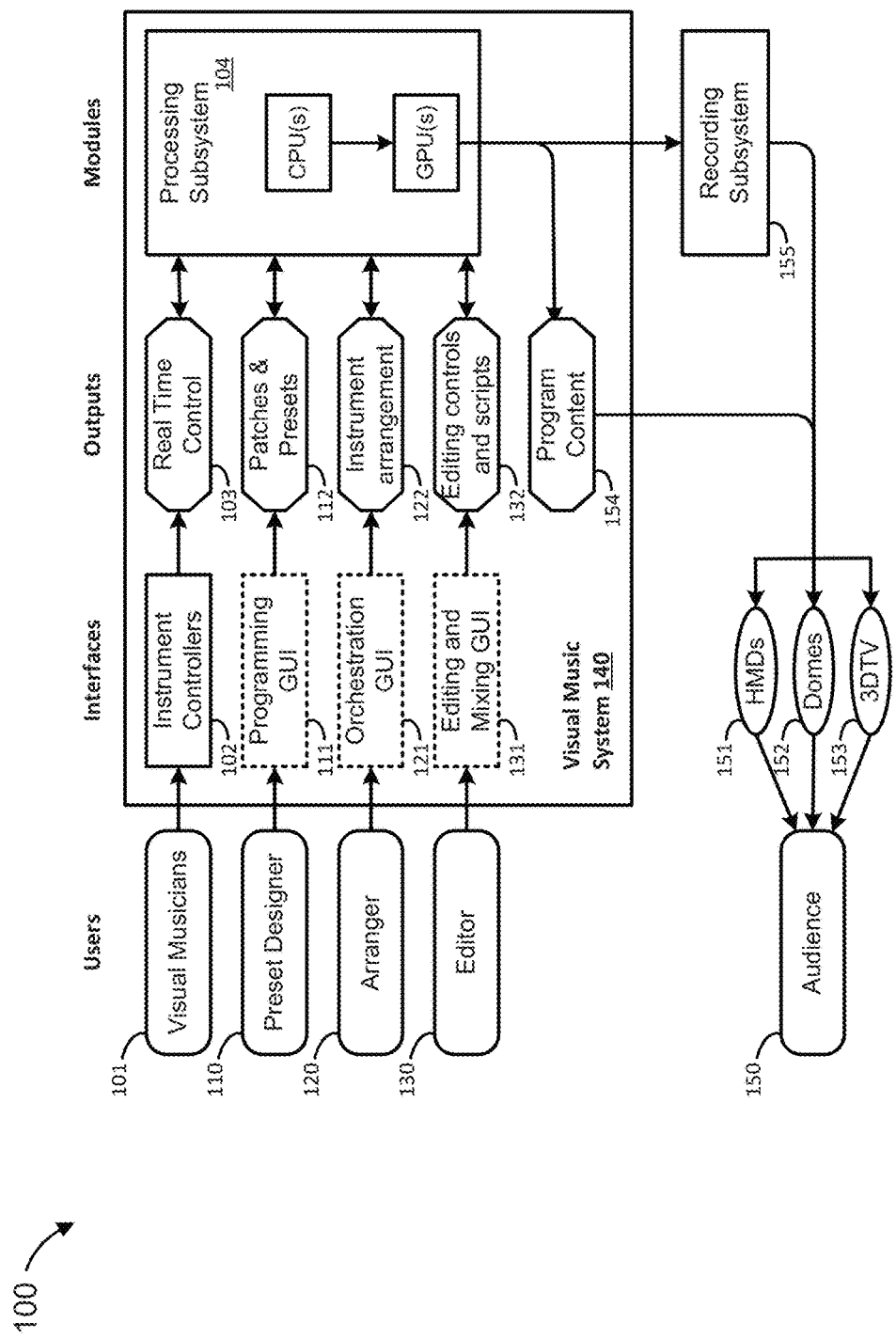
FIG. 1 shows a visual music instrument ecosystem that provides a context for various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Embodiments seek to synthesize "visual music" (VM) for virtual immersive video playback environments. As described herein, visual music generally describes a visual immersive experience that uses three-dimensional (3D) rendered objects to evoke aesthetic responses similar to the experience of listening to music (though visual, as opposed to auditory). In some cases, visual music compositions can be performed and/or played back in context of (e.g., and even in synchrony with) musical accompaniment. Some novel systems and methods described herein seek to physically integrate a user within a visual immersive environment through which the user can perform real-time synthesis (e.g., generation of, and control over) visual elements in the environment and/or simply experience playback of such a synthesized (live or recorded) performance.

Some visual music involves at least two features. One feature is utilization of a non-symbolic language. Many instrument-based art forms (e.g., music, dance, etc.) can derive their meaning from sounds or movements themselves, rather than from sounding or looking like something else (except to the extent that the non-symbolic language evokes a symbol, such as where a composer and/or performer uses sounds from a flute or the shape of a dancer's body to invoke a bird). With such non-symbolic approaches, instruments (e.g., a musical instrument, a dancer's body, etc.) can manipulate linguistic elements (e.g., sounds, movements, etc.) into a language with higher-order structures (e.g., melodies, chords, rhythms, etc.). In contrast, medium-focused art forms tend to derive much of their meaning via representations of people or known objects, so that appreciation thereof involves utilization of long-term memory and high-level cognitive functions (this is even true in many so-called "abstract" visual art forms, which intend to invoke a person, object, etc.). Traditionally, there has been limited application of non-symbolic language to medium-focused expression. Some implementations described herein seek to apply such non-symbolic language to medium-focused art forms in a manner that facilitates synthesis of real-time, abstract expression in a visual medium.

Another feature of visual music synthesis is spontaneous control over the non-symbolic language. After an audio musician has spent years mastering an instrument, the mechanical aspects of playing the instrument can become automatic processes (e.g., the instrument becomes almost an extension of the artist). In instrument-focused art forms, the art (e.g., the notes, phrases, timbres, accents, rhythms, etc.) can often be experienced as it is created, and a full range of possible expressions can be available to an experienced musician (e.g., the expression is limited only by physical limitations of the instrument, physiological limitations of the performer, etc.). In contrast, medium-focused art forms tend to be created and subsequently viewed. This can create a separation between the experience of enjoying the art and the experience of creating the art, which can limit the type of direct communication that is often associated with instrument-focused art forms. Embodiments described herein seek to provide real-time, highly dynamic control of expression as it is enjoyed via a visual medium.

A goal of instrument-focused art forms is to use instruments to create an efficient grammar that translates instrumental elements (e.g., notes, timbres, etc.) into emotional responses; physical actions of the performer can drive a real-time emotional response of the audience in a way that is intuitive and instantly realized. For example, using musical instruments to create tonal and/or harmonic movement in a musical composition can create a sense of "melody," which can elicit certain emotional (e.g., visceral) responses. In a similar manner, visual music instrumentation is described herein for using various types of "visual movement" of visual elements to create a sense of "visual melody." While vision is primarily associated with its functional aspects, such as enabling people to interact with their environment, it also produces a wide range of direct sensations that can be used to construct the vocabulary of an instrument. Motion is central—both of objects in the environment as well as the global motions that arise from shifting the viewpoint within the environment. Color combinations and changes in brightness also produce direct emotional responses. Repetition, symmetry, size, contrast, color, and/or other aspects of shape and structure can have impacts, even universal impacts, on an audience.

Synthesis of a visual melody can be achieved by exploiting the way the visual system tracks moving objects. The visual system evolved to detect animated objects in the environment—fast determination of predator/prey was central to species survival. When such a moving object is detected, the normal saccadic eye muscle movements are suspended and the eye locks onto the object and tracks its movement, so that an object moving in this manner becomes the leading element in the scene, serving a role similar to that of a musical melody. Specific patterns of movement can also trigger near-instantaneous responses that are based more on evolutionary history than on individual or cultural learning, so that the control of these movements can yield a palette for effective non-symbolic communication. While a moving object thus commands attention as needed to be a lead instrument and the movement itself becomes a useful palette of expression, it is desirable for the items being viewed to provide an interesting range of abstract expression that can be structured into an expressive visual language. Thus, some embodiments described herein enable a wide range of dynamic and control over visual melodic elements (e.g., "visual dancers" described herein) to generate complex synthesized aesthetic effects.

Further, such visual melody can evoke more nuanced and complex aesthetic responses when used within a greater musical context. In some implementations, visual music compositional elements (e.g., visual music instruments) are temporally anchored to a space-time path (e.g., built on a path-adaptive coordinate system in a four-dimensional construct). The path can evoke an experience of movement through an immersive world of the visual music composition with temporally anchored visual music compositional elements evoking rhythm, harmony, melody, etc. For example, harmony can be evoked by harmonious use of space, color, movement, etc.; and rhythm can be evoked by rhythmic repetition of visual elements and/or motifs over space and time.

FIG. 1 shows a visual music instrument ecosystem 100 that provides a context for various embodiments. The visual music instrument ecosystem 100 enables a visual musician 101 create a visual music composition for an audience 150 via a visual music system 140. Though the term "music" is used herein, such reference is intended only as a rough analogy to add clarity to descriptions of effects and experiences that are difficult to communicate in text and two-dimensional figures. Some implementations of the ecosystem do not include any audio components (e.g., audio signals are not required as inputs and/or may not be generated as outputs), though some visual music compositions can be played and/or performed with musical accompaniment. Similar to audio music, a visual musician 101 can use controllers 102 that can be manipulated in real-time (e.g., similar to playing a musical instrument) to impact the visual presentation in a structured, consistent, and evocative way. For example, with practice, the motor learning can allow large ranges of complex outputs to be produced with little conscious effort, in a manner similar to how a master piano player can create sounds in real-time without having to devote conscious effort as to where each finger needs to be placed on the keyboard.

Some embodiments of the controllers 102 can be implemented using standard gaming or virtual reality controllers, such as a Razer Hydra or Oculus Touch. Other embodiments can be implemented using hardware specially designed for visual music applications such as described in commonly owned U.S. Pat. No. 9,389,684, titled "Platform for Finger Controls." Still other inputs can be implemented using any suitable instrument controllers 103, such as musical instrument digital interface (MIDI) controllers, motion tracking controllers, biofeedback controllers (e.g., heart rate or brain wave monitors to drive rhythmic input data), etc. The output signals from such devices can provide real-time control 103 over a processing subsystem 104 of the visual music system 140, so that the displayed presentation can respond substantially in real time to the actions of the visual musician.

In some embodiments, other artists and/or technicians can also contribute to the visual presentation. A preset designer 110 may use a graphical user interface (GUI) 111 of the system to configure patches and presets 112 that determine how real-time actions of the musician can affect the output presentation. In some implementations, the effort can be performed off-line (e.g., prior to the performance) by selecting elements from a library (e.g., of low level building blocks) and then patching and configuring them. These preconfigured presets can be provided as real-time options for the artist as a visual music synthesizer palette. For example, the patches and presets 112 can direct how the instrument controllers 102 generate the real-time controls 103 and/or how the real-time controls 103 are processed by the processing subsystem 104. Other implementations provide real-time control (e.g., during the performance) over the patches and presets 112 by a preset designer 110 and/or by a visual musician 101.

An arranger 120 can structure how groups of musicians and/or visual music instruments work together to perform a visual music composition. In the operation of the visual music system 140, the arranger 120 can place three-dimensional models created by each artist into scenes being created, so that the output of different visual instruments can appear at different locations or can overlap into a single effect. In some implementations, the arranger 120 is responsible for establishing transformations (e.g., equations) to map local coordinate systems in which musicians work into global world coordinates shared by elements of the visual music composition. In addition, the arranger 120 can define a camera position, which can determine which visual music instruments are viewed at a particular time and/or can specify the movement of the camera in world coordinates, which can provides audience 150 with the sensation of moving through a scene. The arranger 120 can interface with the visual music system 140 through an orchestration GUI 121 and can generate instrument arrangements 122 to define the transforms (e.g., the equations) for instrument outputs and to set camera positions and view directions in a scene. Some aspects of the instrument arrangements 122 can be specified in real time (e.g., substantially as the music is being performed), while other parts of the arrangement may be created off-line and incorporated into a real-time presentation, or used in any other suitable manner.

An editor 130 can perform a role similar to that of engineers in audio concerts and/or recording studios. In a live performance, the editor 130 may manage technical aspects of the visual music system 140, for example, by adjusting mixing, blending, etc. of outputs produced by the musicians. For example, in an overdubbed composition, the editor 130 can use an editing and mixing GUI 131 to manage the process through which visual tracks are inserted at various time intervals within the composition. In some such compositions, the visual music composition can be assembled from tracks, each recorded in real time. Various embodiments of the editing and mixing GUI 131 can enable editors 130 to sequence and/or mix multiple tracks, overdub tracks (e.g., by integrating tracks recorded at different times into a single composition), punch in and out of pre-recorded tracks (e.g., to insert and/or replace portions of a recorded track), apply filters to tracks, copy (or cut) and paste track data, etc. The output of the editing process can include editing control values and scripts 132 that construct the finished composition into program content 154 presented to the audience 150.

The output of the processing subsystem 104 can be a set of electronic signals operable to display the program content 154 to the audience 150. The output can be formatted for one or more different types of displays, for example, including head mounted displays (HMDs) 151, projection domes 152, stereoscopic televisions 153, other types of virtual reality or augmented reality displays, and/or other displays appropriate for viewing 3D visual environments. The output can also be viewed on two dimensional displays, such as televisions, computer monitors, mobile device displays, etc.

In some embodiments, the output of the system (e.g., from the processing subsystem 104) can be captured by a recording subsystem 155 so as to enable time-shifting and/or space-shifting of the content (e.g., permitting playback of the content at different times and/or places). Some implementations of the recording subsystem 155 can store video content (e.g., rasterized video content), which can include multiple channels for stereoscopic presentations or for multiple projectors in a dome environment, etc. Other implementations of the recording subsystem 155 can store information for constructing an immersion environment, such as a model providing texture mapped polygons for each video frame which can be used to provide different images in response to changes in view direction in a HMD, or the like.

Figure 2A:
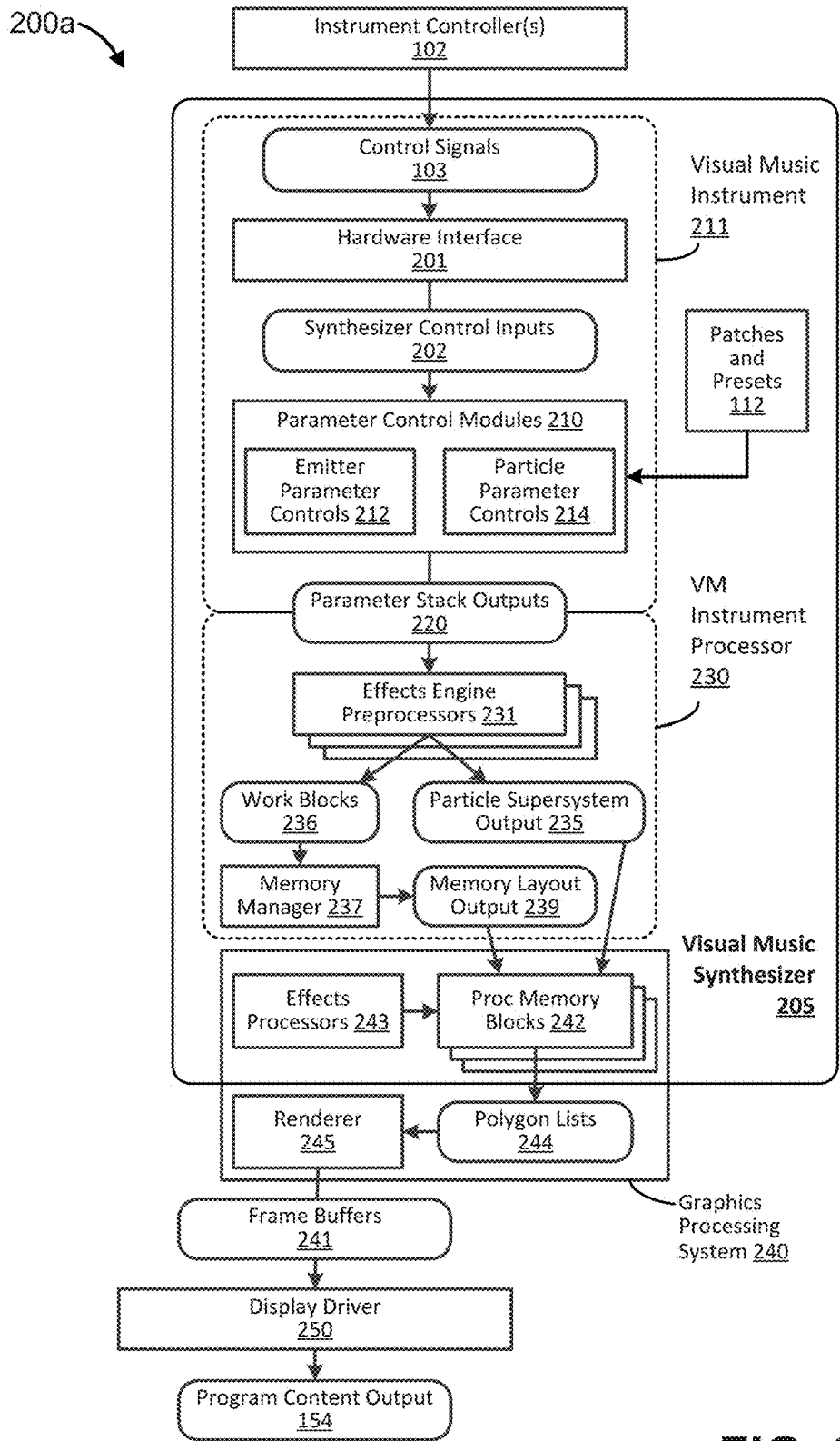
FIGS. 2A and 2B show block diagrams of illustrative computational visual music systems, according to various embodiments.
Figure 2B:
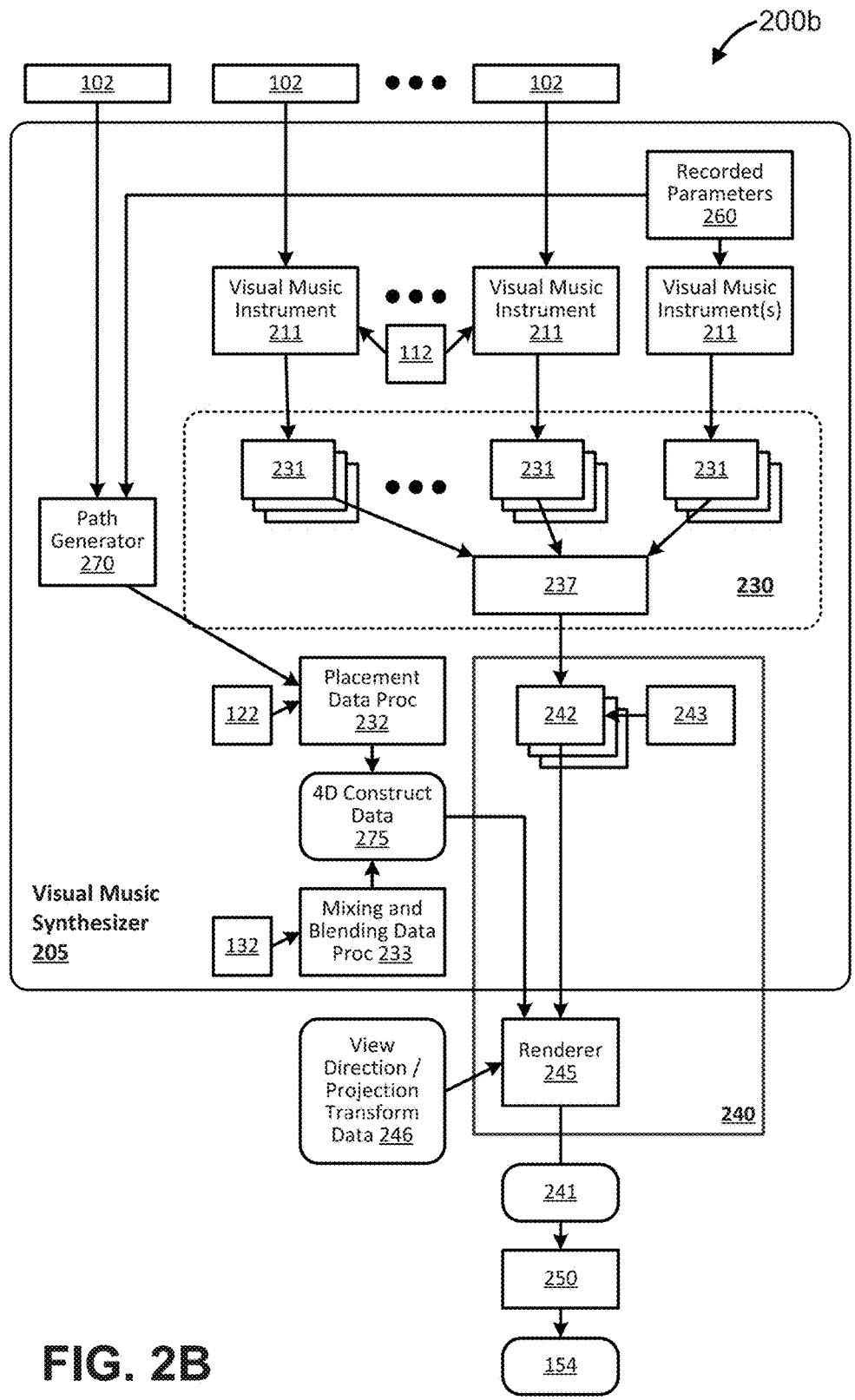

FIGS. 2A and 2B show block diagrams of illustrative computational visual music systems 200, according to various embodiments. For example, the visual music systems 200 can be implementations of processing subsystem 104 of FIG. 1. The visual music systems 200 can be implemented on a single hardware device, such as a personal computer, handheld device, or purpose-built hardware; and/or functionality can be distributed over multiple computing devices, such as having a master computer handling control functions for driving multiple rendering computers devoted to generating data for different regions in the environment.

As illustrated, the visual music system 200 can include a visual music synthesizer 205 that can receives inputs from one or more instrument controllers 102 (e.g., hardware control devices) and can produce program content outputs 154 via one or more additional processing systems. Embodiments of the visual music synthesizer 205 can include one or more visual music instruments 211 and one or more visual music (VM) instrument processors 230. Turning first to FIG. 2A, only a single visual music instrument 211 path is shown for the sake of clarity.

As described with reference to FIG. 1, control signals 103 can be received from control devices (e.g., instrument controllers 102) being operated (e.g., in real time) by visual musicians. The control signals 103 can be received via USB, Ethernet, serial ports, and/or any other suitable interface. The control signals 103 can also come from custom interfaces constructed from analog to digital converters or other ways to supply the signals into the visual music synthesizer 205. The hardware interface 201 can receive the signals and can make the data accessible to modules and other portions of the visual music synthesizer 205. Some implementations can use standard protocols, such as the Microsoft Gamepad Interface, or they can use custom drivers for converting the signals from a particular device. The hardware interface 201 can provide a graphical user interface (GUI) component that informs the user when devices have been connected or disconnected and can details low-level data type values that are available from the device, such as floating point or integer values, positional vectors, and orientation matrices.

The hardware interface 201 can convert the input signals into structures referred to herein as synthesizer control inputs 202. Each synthesizer control input 202 can include one or more low-level data type element, such as floating point, integer, or Boolean values. A synthesizer control input 202 can provide a layer of abstraction between the control hardware and processor-executed functions of the visual music synthesizer 205. For example, a synthesizer control input 202 called "Joystick 6D" may provide 3-axis position and an orientation matrix that can be accessed by program modules. The values within this structure can be supplied via different types of hardware, such as a gamepad interface, a customized controller, or via a combination of mouse position counters and buttons. The hardware interface 201 can be a programmable system, so that users can define synthesizer control inputs 202 and provide conversion modules that enable these sources to be provided from various hardware devices. The conversion modules can also be provided in standard libraries that provide support for generating commonly used synthesizer control inputs 202 from various hardware devices. Some embodiments can also detect hardware being used and synthesizer control inputs 202 desired by the programs being run, and can automatically load and configure interface modules accordingly.

Characteristics of the visual music instrument 211 are driven by an associated set of parameter control modules 210. The parameter control modules 210 can include some modules that are dynamically controllable according to received synthesizer control inputs 202, and other modules that have fixed settings and/or are otherwise defined according to associated patches and presets 112. The various modules can permit various levels of control (e.g., fine and/or gross control) for generating parameter stack outputs 220. The parameter control modules 210 can include emitter parameter controls 212 and particle parameter controls 214 for controlling emitter and particle attributes of particle systems.

Figure 9:
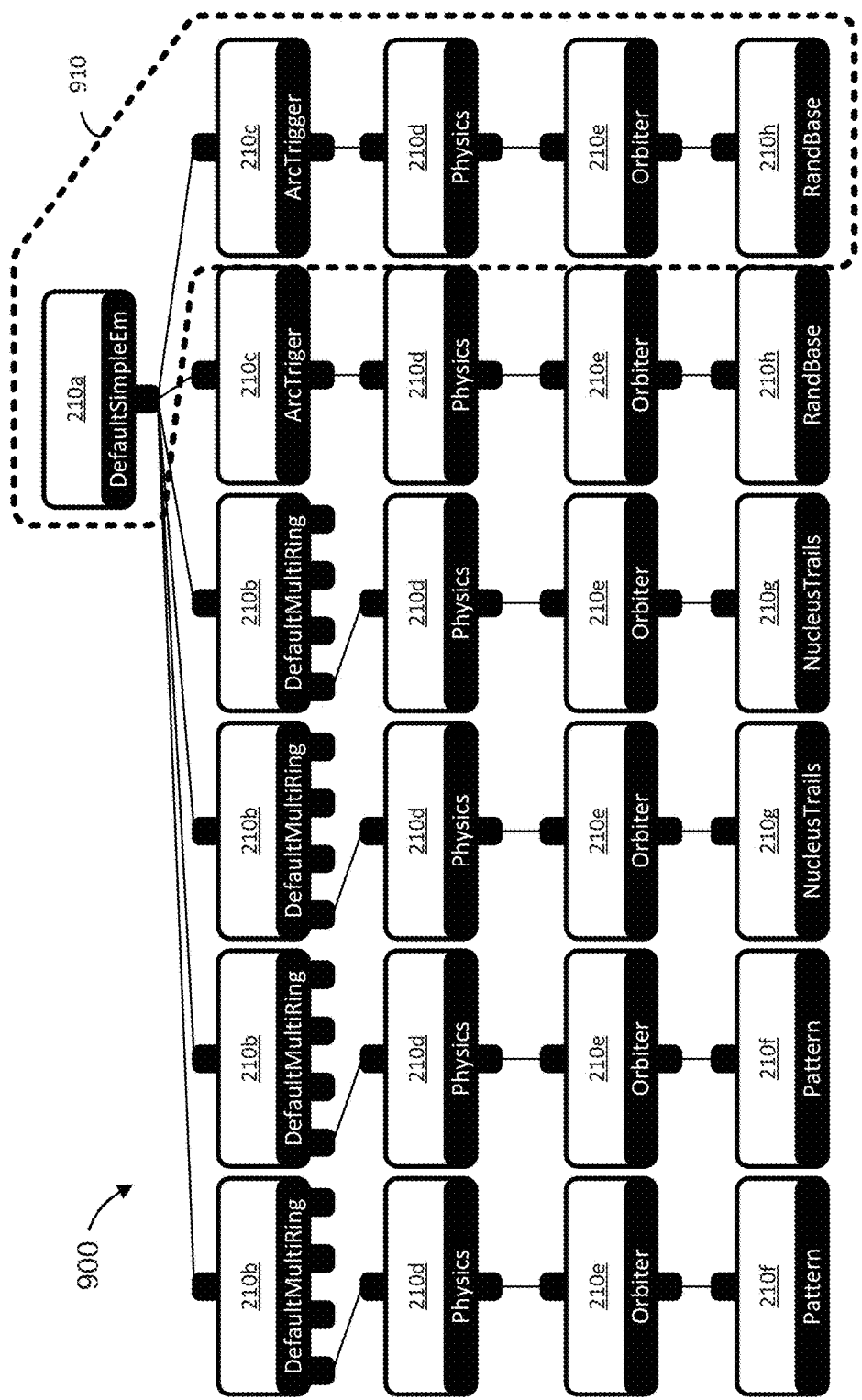
FIG. 9 shows an illustrative portion of a GUI for building and controlling parameter control modules for an illustrative visual music instrument, according to various embodiments.

Some implementations also permit control of one or more modules via one or more GUIs. FIG. 9 shows an illustrative portion of a GUI 900 for building and controlling parameter control modules 210 for an illustrative visual music instrument, according to various embodiments. As illustrated, each parameter control module 210 can include inputs and/or outputs that enable linking of the parameter control modules 210 with each other to generate respective parameter stack outputs 220. For example, a "DefaultSimpleEmitter" control module 210a can define control parameters of a particle system emitter. The emitter control parameters can include, for example, a 3D rendering position and orientation of the respective particle emitter (e.g., a six-axis position and orientation definition), a spin profile of the respective particle emitter (e.g., whether and to what extent the emitter spins around a stationary or moving axis), a reflection value of the respective particle emitter (e.g., whether the emitter is reflected over an axis, a distance from the reflection axis, a number of axes and reflections, etc.), and/or any other suitable emitter control parameters. In the illustrated visual music instrument construct, the single emitter instance emits six different sets of particles, each having its own stack of parameter controls (one such stack is shown as reference 910). In one such stack of particle parameter controls, particles are emitted according to a "Default-MutiRing" control 210b, and each emitted particle is affected in a programmable fashion by a "Physics" control 210d and an "Orbiter" 210e control and is rendered according to a predefined particle "pattern" control 210f. Those and/or other particle parameter controls can affect color profiles of the particles (e.g., particle colors, particle color palates, how color changes over the particles' life, etc.), shape profiles of particles (e.g., particle shapes, textures, patterns, how shape changes over the particles' life, etc.), sizes the particles (e.g., absolute and/or relative sizes, how sizes change over the particles' life), gravitational profiles of the particles (e.g., how the particles are impacted by physics, etc.), spin profiles of the particles (e.g., whether each particle spins, speed of spin, axis of spin, randomness of spin, how spin changes over the particles' life, etc.), lifetime profiles of the respective plurality of particles (e.g., when each particle appears and disappears, how long the particles remain visible after being emitted, etc.), density profiles of the particles (e.g., how many particles are emitted at a time, etc.), and/or any other suitable particle parameter controls.

Returning to FIG. 2A, the parameter control modules 210 receive the synthesizer control inputs 202 and generate the parameter stack outputs 220 for controlling the visual music synthesizer 205 (e.g., for driving the output of the VM instrument processor 230). The conversion of synthesizer control inputs 202 into parameter stack outputs 220 can be controlled by presets and patches 112 that can be preconfigured by a preset designer, or the like, and/or adjusted in real time. For example, the presets and patches 112 can define which parameter control modules 210 (e.g., from a library of parameter control modules 210) are associated with a particular type of instrument, or as a default (e.g., starting point) for creation of a type of instrument. The presets and patches 112 can additionally or alternatively define which of the parameter control modules 210 are dynamically controllable (e.g., by instrument controllers 102) and which operate according to preset values, functions, etc. The presets and patches 112 can additionally or alternatively define characteristics of particular parameter control modules 210, for example, defining which values of a particular parameter control module 210 can be adjusted, etc. In some embodiments, the presets and patches 112 can enable an instrument controller 102 to interface with a particular set of parameter control modules 210 and/or values in a certain manner. For example, in a first mode, the instrument controller 102 can control a first subset of a large number of parameter control module 210 values; and in a second mode, the same instrument controller 102 can control a second subset of the parameter control module 210 values. In some implementations, each parameter control module 210 is controlled in accordance one or more low-level data types, such as floating point or integer values, that can be configured into a hierarchy of control structures as desired for different parameter control modules 210, for different visual music instruments 211, for system management functions (e.g., interconnecting the parameter control modules 210), etc. Some such parameter control modules 210 use a proprietary Visual Music Interface Format (VMIF), which establishes protocols for storing and exchanging the parameter control module 210 values.

The outputs (e.g., values) of the various parameter control module 210 paths generate parameter stack outputs 220. Some portions of the parameter stack outputs 220 can be derived directly from a particular parameter control module 210, while other portions of the parameter stack outputs 220 can be derived from a combination of parameter control modules 210 (e.g., parameter control modules 210 can generate outputs independently and/or dependently). The parameter stack outputs 220 can be used as inputs to parallel set of effects engine pre-processors 231. For parameter stack outputs 220 directed to controlling particle system parameters, the effects engine pre-processors 231 can be particle engine pre-processors. For example, each stack 910 of parameter control modules 210 shown in FIG. 9 can be processed in parallel (e.g., or otherwise concurrently) by a respective one of multiple effects engine pre-processors 231. The outputs of the effects engine pre-processors 231 can be combined to generate a particle supersystem output 235 associated with the visual music instrument 211. For example, such an architecture can permit access to, and real-time dynamic control of, many parameters of a complex particle system built from multiple parameter stacks. The particle supersystem output 235 can include any suitable definition for rendering of the visual music instrument 211. For example, some implementations of the particle supersystem output 235 include a list of particles to be added to the particle system, a set of control values for controlling new and existing particles, etc.

Some embodiments of the VM instrument processor 230 include a memory manager 237. Rendering complex particle systems and/or other 3D-rendered objects can consume appreciable time and processing resources, which can be impractical. For example, such resource consumption can frustrate the ability of the visual music synthesizer 205 to permit real-time, highly dynamic control over large numbers of parameters of complex particle systems, and such control can be desirable for enabling artistic expression using visual music instruments 211. In some such embodiments, the outputs of the effects engine pre-processors 231 can further include work blocks 236 that indicate memory requirements for processing the effects outputs (e.g., the particles and their control values). Embodiments of the memory manager 237 can compute a memory layout output 239 from the work blocks 236, and the memory layout output 239 can be sent to the graphics processing system 240 for rendering. For example, the memory layout output 239 can be generated in OpenCL, or the like, to allocate certain processing memory blocks 242 of the graphics processing system 240 to handle certain work blocks 236 according to various optimizations.

In some implementations, the graphics processing system 240 includes a graphics processing unit (GPU) having a large number of memory blocks. The memory layout output 239 can be generated in any suitable format usable by the graphics processing system 240, and can effectively lay out which memory (and/or processing) blocks 242 of the graphics processing system 240 are used to process which portions of the particle supersystem output 235. For example, in a visual music instrument 211 like the one associated with FIG. 9, different stacks of parameter control modules 210 can generate widely varying numbers of polygons and/or different complexities of texture maps, etc., such that different amounts of resources may be used to process different portions of the particle supersystem output 235 corresponding to the different parameter stack outputs 220. The memory manager 237 can generate the memory layout output 239 to optimize scheduling and distribution of processing loads across the blocks of the graphics processing system 240. The amount of allocated particle memory can be different for each parameter stack output 220 (e.g., for each effects engine pre-processor 231 output, and the allocation can vary in each rendering frame. For example, for some types of effects, the number of particles (e.g., and the block size) can be relatively constant from frame to frame; for other types of effects, particles can be added at varying rates and removed by an aging out process, so that numbers of particles can widely vary per frame; for still other types of effects, effects engines participating in generating the effects can start or become active, while others can finish or become inactive in each frame; etc. Accordingly, memory requirements for processing of different effects can change per effect per frame in some cases. Embodiments manage particle memory allocations in blocks, rather than in individual per-particle slots, so that each parameter stack output 220 or effects engine pre-processor 231 is allocated one or more blocks. With such an approach, memory management can be more efficient on the VM synthesizer (e.g., a CPU), which may not be able to perform per-particle management efficiently; while the resulting allocation involves blocks of graphics processing system 240 (e.g., a GPU) memory. For example, using a block-based approach can enable a single CPU processing step to serve many particles (e.g., AllocBlockSize). Particles in blocks can all be assigned to a same GPU work group, thereby sharing same parameters and a same instruction pipeline. Embodiments include block profilers that can optimize block sizes accounting for trade-offs between memory utilization (e.g., not having empty slots in blocks) and efficient use of processing (e.g., having fewer groups to manage). Some embodiments also include particle removal engines that can remove particles based on age without relying on feedback from the GPU. For example, all particles associated with a particular parameter stack output 220 can have a common age, so that they can be removed in the order that they were added. In some such cases, particle age can by dynamically adjusted; and, because age is common to all particles, particle sequencing can be preserved. In some cases, when all particles in a block have aged out, the block can be released in the memory manager 237, so it can be allocated for other parameter stack outputs 220. Similarly, when a new particle is added, a new block can be requested from the memory manager 237 and used for subsequent new particles until it is filled (at which point, another new block can be requested). In some embodiments, the memory manager 237 can allocate blocks in a manner that seeks to avoid concurrently having multiple partially filled blocks. For example, output addresses can be different from input addresses, so that the outputs can shift each frame to fill up any block space previously used by aged-out particles.

As illustrated, embodiments of the graphics processing system 240 can provide a bridge between the visual music synthesizer 205 (e.g., processed by one or more CPUs) functions and rendering functions. For example, the graphics processing system 240 receives the particle supersystem output 235 from the visual music instrument processor 230 into processing memory blocks 242 allocated according to the memory layout output 239 from the visual music instrument processor 230. The processing memory blocks 242 can be processed by effects processors 243 (e.g., particle processors) to generate renderable output data 244. For example, the output 244 can be polygons (or other suitable graphics primitives) and texture maps that can be rendered by a renderer 245 of the graphics processing system 240. The renderer 245 can generate a series of frame buffers 241 containing the pixel values to be displayed via a display system (e.g., an HMD, etc.). Some implementations are optimized for handling of visual music. For example, embodiments can implement and exploit a customized shader to support a larger number of transparent layers than can be supported effectively using standard blending algorithms. In some embodiments, the renderer 245 includes an in-place memory strategy for supplying information to shaders that manage the rasterization. For example, OpenGL (or DirectX, or other suitable frameworks) can be used to implement shader code to manage the rasterization. The code can pick out information needed to create polygon vertices from the same memory blocks used by the particle engines rather than creating a separate buffer between the parameter stack outputs 220 and the particle supersystem output 235. In some cases, each particle associated with a parameter stack output 220 or effects engine pre-processor 231 can be rendered as a separate "billboard" polygon. In some implementations, a set of particles associated with a parameter stack output 220 or effects engine pre-processor 231 can be rendered at multiple locations in a scene by supplying a separate transform for each such location.

In some implementations, certain functions of the visual music synthesizer 205 can be implemented as instructions executable by one or more processors, such as a central processing unit (CPU) and/or GPU. Segments executing on the CPU can be programmed in any suitable language, such as C++ or C#, segments involving allocations of GPU memory can be specified using an open standard like OpenCL, or using a proprietary language like CUDA, and rendering functions of the GPU can operate in OpenGL, or the like. The processing load may also be divided among multiple computers, such as having separate computers to construct the images feeding different projectors in a dome environment or having the load for a single display be divided for processing and then reassembled afterward. Operations of the visual music synthesizer 205 and/or graphics processing system 240 can also be performed as offline processes (e.g., where scenes can be rendered at a higher resolution or higher frame rate than can be achieved in real-time).

Some embodiments further include one or more display drivers 250. The display driver(s) 250 can receive the frame buffers 241 and can generate program content output 154 accordingly. Different display drivers 250 can be used to generate different types of program content output 154 for different types of displays and/or environments. In some implementations, the program content output 154 is in an established industry standard format, such as stereoscopic video in HDMI v1.4a. The program content output 154 format can also be specific to a particular display system, such as a set of warped video outputs to drive multiple projectors for a dome. Embodiments of the display drivers 250 can also include support for tracking view direction (e.g., for HMD support) and for using the direction tracking to modify operation of the display driver 250, the graphics processing system 240, and/or the visual music synthesizer 205 to generate program content output 154 for the region of the environment being viewed.

As described above, the program content output 154 can include any suitable type of output data. For example, some implementations generate a VMIF output as the program content output 154, so that the output effectively indicates the parameter stack outputs 220 and/or the particle supersystem output 235. This can enable editing of, and/or dynamic control over, individual (or groups of individual) parameter values, parameter control modules 210, etc. Additionally or alternatively, the program content output 154 can include information usable directly by the display drivers 250 (e.g., frame buffer 241 data). For example, some implementations can include a visual music media player that enables playback control of a previously recorded visual music composition (e.g., with conventional media playback controls, such as play, pause, rewind, etc.) by playing back stored frame buffer 241 data.

Though FIG. 2A describes a visual music system 200a having a single visual music instrument 211, embodiments can be configured to handle multiple visual music instruments 211 and/or additional types of editing and/or other interactions (e.g., as described with reference to FIG. 1. FIG. 2B shows an illustrative visual music system 200b that provides support for such additional visual music instruments 211 and/or interactions. As shown, one or more visual music instruments 211 can be controlled by multiple instrument controllers 102 and/or one or more visual music instruments 211 can be controlled according to pre-recorded parameter data 260. For example, a scene of a visual music composition can include visual music instruments 211 being controlled by multiple visual musicians in context of pre-recorded and/or other elements. As described with reference to FIG. 2A, various values of various parameter control modules 210 associated with the different visual music instruments 211 can be controlled to generate parameter stack outputs 220, which can be processed by sets of effects engine pre-processors 231. The sets of effects engine pre-processors 231 can generate particle supersystem outputs 235 and/or work blocks 236 that can be allocated for processing (e.g., by a memory manager 237) to a graphics processing system. The allocations can yield processing memory blocks 242 operated on by effects processors 243 to generate output data suitable for rendering by a renderer 245.

In some implementations, each particle supersystem output 235 corresponds to a respective visual music instrument 211. In other implementations, a single particle supersystem output 235 can be generated in association with a combination of multiple visual music instruments 211 and/or multiple particle supersystem outputs 235 can be generated in association with a single visual music instrument 211. Some implementations storing and/or exchange instrument data as control parameters, rather than as rendered objects, which can allow greater flexibility in placing, editing, blending, etc. multiple contributions (e.g., at multiple times, by multiple visual musicians and/or editors, etc.). For example, particle supersystem outputs 235 and/or other visual elements from multiple sources can be integrated into a single composition. When multiple VM instrumentalists work together, each may have a separate respective computing and rendering system, or systems may be shared, to generate mixed output from all sources. The VMIF protocol can be used to storing and/or exchanging such parameters across local area networks (LANs), wide area networks (WANs), or any other suitable communication links.

Some embodiments include a placement data processor 232. The objects being processed in the effects engine pre-processor 231 can be defined in a local coordinate system for the associated visual music instrument 211 (e.g., a scene coordinate system and/or a model coordinate system). The placement data processor 232 can generate the transforms that are used to map the primitives into a global 3D coordinate system (e.g., or any other suitable coordinate system) and can establish a camera position from which a scene is viewed. Movement of the camera position can convey (e.g., to a visual musician, viewer, etc.) a sensation of moving through the immersive environment of the visual music composition. As described in more detail below, a four-dimensional, path-adaptive coordinate system can be established, and visual objects (including the visual music instruments 211) can be anchored to the path to establish a compositional time-space. For example, as a camera position is advanced, instruments can be repositioned in the global 3D coordinates (according to path anchor data) to construct a series of scenes through which the audience can traverse, wherein a same visual music instrument 211can be a part of multiple scenes. The placement of the instrument arrangements within these scenes can evoke aesthetics similar to those of melody, harmony, rhythm, etc. in an audio composition. Aspects of object placement are described further herein (e.g., with reference to FIG. 12.

Some embodiments further include a mixing and blending processor 233. Embodiments of the mixing and blending processor 233 can perform various functions to facilitate incorporation of multiple visual objects in a single scene. For example, embodiments can adjust brightness level and color balance parameters associated with various effects engine pre-processors 231 to properly balance visual objects presented in a scene. When assembling an overdubbed composition, the mixing and blending processor 233 can be used to determine which effects engine pre-processors 231 are recorded and/or viewed in each pass (e.g., for multi-track composing, editing, etc.). Some embodiments can handle complex layer transparencies, complex lighting effects, perform automated mixing or blending functions (e.g., automated color palate normalization), and/or perform other suitable functions.

In various embodiments, the visual music systems 200 enable control, synthesis, and/or display of various types of visual objects and effects. Some such objects can manifest an aesthetic similar to melody instruments in a scene; other such objects can manifest an aesthetic similar to support (e.g., harmony, backup, or rhythm section) instruments in a scene; and still other such objects can manifest an environmental or contextual aesthetic. Each can be associated with different types of effects engine pre-processors 231, and each can differ in whether and how it is controlled and how it generates its graphic primitive outputs. Combining these different objects can create visual music compositions that convey an aesthetic of a small or large ensemble composition, a solo work, etc. For example, while an audience traverses through scenes of a visual music composition, melody-type visual music instruments 211 can appear to fly along with the audience, remaining in prominent view; while support-type visual music instruments 211 may move into and out of visual relationship with the melody-type visual music instruments 211, and environmental-type visual music instruments 211 may establish the sense of movement through the scene.

Movement through a visual music composition can be conveyed by use of a four-dimensional (4D) path, which defines a time-space for the composition. For example, as the composition progresses, the audience can traverse time and space according to contours defined by the path. As illustrated, some embodiments of the visual music synthesizer 205 include a path generator 270. The path generator 270 can receive path information from one or more instrument controllers 102 and/or from recorded parameters 260. For example, the path can be generated live (e.g., concurrently with, or slightly ahead of, artists' performances of visual music instruments 211) and/or pre-recorded (e.g., the path can be recorded as a track and overdubbed with visual music instrument 211 track data). In some implementations, the path generator 270 can auto-generate some or all of a 4D path algorithmically. For example, a 4D path can be automatically generated with a defined amount of randomness, a defined amount of variation, maximum and/or minimum amounts of curvature, selection of a particular mood, and/or other controllable parameters.

The 4D path information output from the path generator 270 can be received by the placement data processor 232 and used in determining placement of scene objects. In a conventional three-dimensional modeling environment, objects are placed in space, and a virtual camera can be positioned (located and pointed) in that space; at any particular time, the scene is defined by the virtual camera's position in space at that time relative to other objects' positions in that space. In contrast, embodiments can define object placement by anchoring the objects in four-dimensions relative to the path; to a particular three-dimensional spatial location relative to the path at one or more anchor times. In such embodiments, the output of the placement data processor 232 can be 4D construct data 275, which can be stored in a 4D construct data store (e.g., 4D construct data store 1015 of FIG. 10, which may be implemented as one of the storage devices 1520 of FIG. 15).

By building visual music compositions on a 4D path construct, the visual music systems 200 can effectively be a 4D immersive modeling system. Embodiments of such a system can generate the 4D construct data 275 to include a path-adaptive coordinate system defined by a sequence of coordinate transform matrices, each stored in association with a respective unique time index associable with a path time basis. For example, a six-dimensional instrument controller 102 can be used to effectively lay out a path in three-dimensional space over time (e.g., conceptually analogous to a sky-writer airplane laying out a contrail path in the sky). As the path is laid out, a viewpoint of the path creator in the three-dimensional space (e.g., a present position and orientation) can be periodically sampled to record an associated coordinate transform matrix at each of multiple sample times (e.g., every twenty milliseconds). In some implementations, each coordinate transform matrix can be a four-by-four transform matrix expressed in homogenous coordinates, which can express local and overall scaling, shearing, etc. Each sampled coordinate transform matrix can be stored in association with a time index that corresponds to the sample time at which the coordinate transform matrix was recorded. The time index can be a sequential index value, a timecode, or any other suitable index. The 4D construct data 275 can also include a path-anchored object locator for each of the (some or all) renderable three-dimensional objects (e.g., the visual music instruments 211, etc.) defined in the visual music composition. Each path-anchored object locator can define a three-dimensional position of an associated one of the renderable three-dimensional objects of the composition at an associated anchor time associable with the path time basis. For example, each renderable three-dimensional object is located in the composition according to the compositional space-time defined by the 4D path.

The path generator 270 can include a path recording system having a real-time path controller input and a coordinate transform matrix output, where the coordinate transform matrix output indicates, at each of multiple record times, a present path coordinate system for the record time. For each of the sequence of coordinate transform matrices, the coordinate transform matrix can be computed according to a corresponding present path coordinate system indicated by the coordinate transform matrix output, and the unique time index can correspond to the record time for the corresponding present path coordinate system. For example, the path can be sampled during recording to generate the sequence of coordinate transform matrices and respective time indices. In some embodiments, one or more instrument controllers 102 operates as a human interface device having a real-time path controller output generated according to physical interactions with physical control interfaces of the human interface device, and the real-time path controller input is coupled with the real-time path controller output. For example, a user can effectively drive the path with the instrument controller 102 to generate the path that is recorded.

Figure 10:
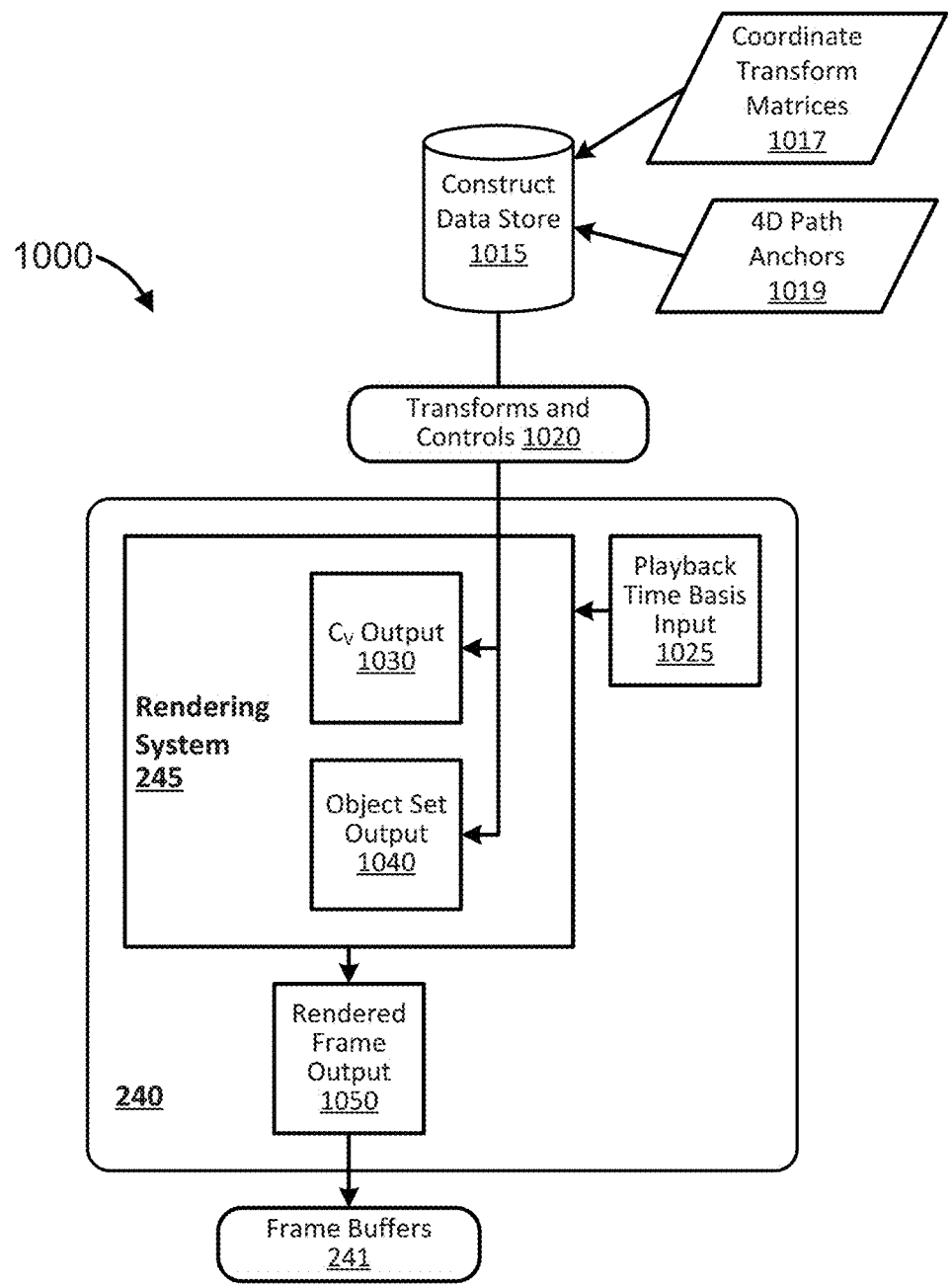
FIG. 10 shows a rendering environment that generates frame rendering outputs that account for the path-defined compositional time-space as a function of received 4D construct data, according to various embodiments.

As described above, the scene objects can be output in a manner usable by the renderer 245 of the graphics processing system 240 to render frames. For example, such rendering can use processed particle (and/or other model) data and 4D construct data 275 to generate a 3D rendered scene at each playback frame time. As illustrated in FIG. 10, embodiments can include a rendering environment 1000 that generates frame rendering outputs that account for the path-defined compositional time-space as a function of received 4D construct data, according to various embodiments. Some such embodiments are described further herein, for example, with reference to FIGS. 2B and 12. Embodiments of the rendering environment 1000 include a rendering system 245 (e.g., a rendering engine), which can be implemented as part of the graphics processing system 240. As illustrated, embodiments of the rendering system 245 can be coupled with a 4D construct data store 1015 that can provide the rendering system 245 with rendering input information, such as transforms and control data 1020. For example, the transforms and control data can include world-to-camera types of transform matrices, local-to-world types of transform matrices, blending controls, shading controls, and/or other rendering instructions and input data. The rendering system 245 can also include a viewpoint coordinate system ($C_V$) output 1030, an object set output 1040, and a rendered frame output 1050. As illustrated, the $C_V$ output 1030 and the object set output 1040 can be internal (e.g., instantaneous) outputs of the rendering system 245.

Each output of the rendering system 245 can be updated at each of a sequence of playback frame times. In some implementations, each playback frame time is defined according to a playback time basis (received at a playback time basis input 1025), and the playback time basis can be the same as, or different from the path time basis. For example, it can be desirable to render frames multiple times more quickly than the rate at which the path was sampled. As such, embodiments can render frames according to interpolations of data between samples of the 4D path. Some display systems (e.g., HMDs) require fast update rates, and some implementations of the rendering system 245 can include special support for running display drivers for such display systems (e.g., which receive head position updates) asynchronously.

Embodiments of the rendering system 245 compute the viewpoint coordinate system ($C_V$) output 1030 as a function of a frame coordinate system ($C_{PFT}$) defined according to at least one of the sequence of coordinate transform matrices 1017 for which the respective unique time index corresponds to the playback frame time. For example, as described above, 4D construct data can include a path-adaptive coordinate system defined by a sequence of coordinate transform matrices 1017, each stored in association with a respective unique time index associable with a path time basis; and path-anchored object locators 1019, each defining a three-dimensional position of an associated one of the renderable three-dimensional objects of the composition at an associated anchor time associable with the path time basis. The $C_V$ can be defined as the one of the sequence of coordinate transform matrices 1017 for which the respective unique time index corresponds to the present playback frame time, or according to an interpolation between the coordinate transform matrices 1017 having respective unique time indices closest to the present playback frame time. The $C_{PFT}$ (e.g., and the $C_{HT}$ described below) are typically not provided directly to the rendering system 245; rather, they may be used to compute transforms (e.g., one or more transforms of the transforms and control data 1020), which can be provided to the rendering system 245, for example, as described with reference to FIG. 2B.

In some embodiments, the $C_V$ output 1030 is further computed according to a path-prospective viewpoint vector pointing from an origin point in the $C_{PFT}$ to a corresponding point in a horizon coordinate system ($C_{HT}$). The $C_{HT}$ is defined according to at least one of the sequence of coordinate transform matrices 1017 for which the respective unique time index corresponds to a horizon time that is a predetermined temporal distance subsequent to the playback frame time. For example, the viewing experience can be improved, in some cases, by adapting the viewpoint at any particular playback frame time to "look ahead" to some point on the horizon. As the path changes speed and/or direction, it can be desirable to update the horizon location accordingly. The path-prospective viewpoint vector can have a magnitude and direction that defines the "look ahead" point on the horizon. In some implementations, at any playback frame time, embodiments can compute a temporal distance into the future according to a sequential number of coordinate transform matrices 1017 ahead of the present playback frame time. For example, where the path speed is substantially constant and/or where the path recording sampling rate dynamically adjusts to the speed of path traversal, a fixed number of coordinate transform matrices 1017 in the sequence can substantially correspond to a particular distance travelled over a fixed amount of time or a fixed distance travelled over a particular amount of time (i.e., and the path-prospective viewpoint vector can be defined according to that fixed amount of time or distance into the future of the path traversal). In other implementations, at any playback frame time, embodiments can compute a temporal distance into the future by computing a distance travelled (e.g., along the path, or along a particular vector direction) between each subsequent coordinate transform matrix 1017 in the sequence; and the path-prospective viewpoint vector can be defined according to a fixed distance travelled. For example, a particular $C_{HT}$ can be computed at the horizon distance into the future, and a particular origin point (e.g., 0, 0, 0) can be located in the $C_{HT}$. The path-prospective viewpoint vector can be drawn between the corresponding origin points (e.g., 0, 0, 0) in the $C_{PFT}$ and the $C_{HT}$, and the $C_V$ can be oriented according to the direction of the path-prospective viewpoint vector (e.g., such that the path-prospective viewpoint vector is normal to an x,y plane in the $C_V$). Some implementations use the path-prospective viewpoint vector to mitigate disorientation or nausea experienced by some users of certain immersive environments. For example, discomfort can be produced by changes in view direction that are not resulting from muscle actions, such as head movements that are biologically wired into the visual cortex. Adjusting the $C_V$ according to the path-prospective viewpoint vector can reduce the frequency and magnitude of such viewpoint changes, which can appreciably reduce such discomfort.

At each frame time, according to the $C_V$ output 1030, a view frustum can be defined according to a range of the unique time indices of the sequence of coordinate transform matrices that make up the present "view" of the audience (e.g., the closest and furthest extents of the view at that time). The view frustum can include a front frustum (i.e., the closest extent of the view) and a rear frustum (i.e., the furthest extent of the view). In some implementations, the frustum can also include left and right frustums, top and bottom frustums, etc. (e.g., depending on specifications of the display driver 250, etc.). Each extent of the frustum can be defined according to a plane in the CV, as a curved surface that is a constant distance from a virtual camera position, as an interpolated position between coordinate transform matrices 1017, and/or in any other suitable manner. In some implementations, the set of renderable 3D objects for a particular playback frame time can include objects not located within the view frustum in that playback frame time. For example, it can be desirable for objects to fade in or out of view, and/or to be available to support certain types of viewer movement (e.g., large head movement when using an HMD, etc.). In some implementations, the path-anchored object locators 1019 are defined so that the anchor time associated with at least one of the plurality of renderable 3D objects indicates where it is desired (the 3D position) for the associated renderable 3D object(s) to be located at the time (in the path time basis) when the associated renderable 3D object(s) respectively reach the front frustum.

Embodiments of the object set output 1040 can indicate, for each of a set of the renderable 3D objects (e.g., some or all of the 3D renderable objects), an anchor coordinate system ($C_{AT}$) defined according to at least one of the sequence of coordinate transform matrices 1017 for which the respective unique time index corresponds to the anchor time of the renderable 3D object (according to the path-anchored object locator 1019 associated with the renderable 3D object). In some implementations, the object set output 1040 indicates the set of the renderable 3D objects as those of the renderable 3D objects for which the respective associated anchor times are each within a view frustum for the playback frame time.

Embodiments of the rendered frame output 1050 can include the set of the renderable 3D objects, each rendered in an immersive virtual environment according to a transformed 3D position. The transformed 3D position can be computed by using the $C_{AT}$ and object scene coordinates (described below) to construct a transform matrix that can be used to map local model coordinates into a camera view (e.g., the mapping computed according to the transforms and control data 1020). For example, the location of an object in a particular frame can correspond to that object's location relative to the space-time defined by the path; so that objects having anchor times subsequent to the present playback frame time will be located according to where the path will be at those future anchor times.

Different types of objects can be placed in visual music compositions. For example, as described above, a scene of a visual music composition can include different particle systems having multiple virtual particles emitted from an emitter location defined, at each playback frame time, according to the 3D position of the renderable 3D object for the playback frame time. For example, so-called "dancer" visual objects described herein can be such objects. Some implementations enable introduction of other types of scene objects, such as a two- or three-dimensional image, video, model, or other object located in the space-time of the path.

Different types of objects can be placed in the visual music composition in various ways, which can effectively produce different types of scene objects. One type of object placement can define a 3D position of a renderable 3D object as a set of three spatial coordinates (e.g., a horizontal axis value (x), vertical axis value (y), and depth axis value (z)), mapped into the $C_V$ according to a particular anchor time. Such placement effectively locates an instance of the object in a particular space-time location along the path. Another type of object placement generates range placement objects, for which the anchor time associated with the renderable 3D range placement object is defined as multiple, functionally related anchor times, such that the renderable 3D object is anchored to multiple temporal locations along the path-adaptive coordinate system. For example, the path-anchored object locator 1019 for a range placement object can define the anchor time as a list of anchor times, as a function of time (e.g., in the path time basis), etc., so that the object appears in the scene along the path according to a certain temporal period (e.g., every five seconds, on each down beat of an accompanying piece of music, etc.), a certain distance period (e.g., every foot of virtual distance travelled along the path), etc.

Another type of object placement can result in "co-flier" objects, which appear to fly along with the path traversal. In some embodiments, a travel distance unit can be defined according to a difference, with respect to a playback time basis, between sequentially adjacent unique time indices in the path-adaptive coordinate system (e.g., corresponding to a virtual distance in 3D space that is travelled by traversing the path from one time index to the next). In such a context, a co-flier object can have its anchor time defined according to a time horizon that is a predetermined fixed number of travel distance units ahead of the $C_{PFT}$. For example, the time horizon can be path-anchored to remain a fixed travel distance ahead of a present viewpoint position (e.g., a present position of a virtual camera), and the co-flier objects can be anchored according to that time horizon. From that horizon anchoring point, the co-flier can retain a full six degrees of freedom of movement (e.g., the co-flier can even move closer to, or further from, the viewer, as the viewer traverses the path). In some implementations, co-flier dancer visual objects represent "melodic" visual instruments, soloist visual instruments, or other such visual instruments that capture the focus of the audience in the scene.

Another type of object placement in some implementations can result in "terrain" objects. Non-terrain types of objects typically have 3D positions represented by three spatial coordinates (e.g., a horizontal axis value (x), vertical axis value (y), and depth axis value (z)), mapped into the $C_V$ according to one or more anchor times. In contrast, 3D positions of terrain objects can be defined by a first (e.g., vertical, or 'y') axis value and a second (e.g., horizontal, or 'x') axis value that is a function of the first axis value, still mapped into the $C_V$ according to one or more anchor times. For example, the spatial coordinates of a terrain object can be represented as (x, f(x), z), or the like. With such a representation, a particular renderable object can be placed at multiple instances along a functionally defined curve to form a terrain cross-section, such as a hill, valley, bridge, arch, etc.

As described above, the rendered frame output 1050 can be used to generate frame buffers 241 for output to display drivers 250, or the like. In some embodiments, an immersive video playback system (e.g., HMDs 151, domes 152, and/or 3DTVs 153 of FIG. 1, and/or other suitable systems) can include a rendered frame input coupled with the rendered frame output of the rendering system 245 (e.g., via one or more display drivers 250) and a video display system (e.g., optics and/or other display components of the immersive video playback system) that outputs the rendered frame input. Embodiments of the immersive video playback systems can include a viewpoint tracker that outputs a real-time orientation of the immersive video playback system. In some such embodiments, the $C_V$ output 1030 for each playback frame time can be computed further as a function of the real time orientation of the immersive video playback system at the playback frame time. In other such embodiments, the $C_V$ output 1030 for each playback frame time includes information usable by the device drivers 250 or other components to compute a present rendered view frame according to the present real-time orientation of the immersive video playback system.

Figure 3:
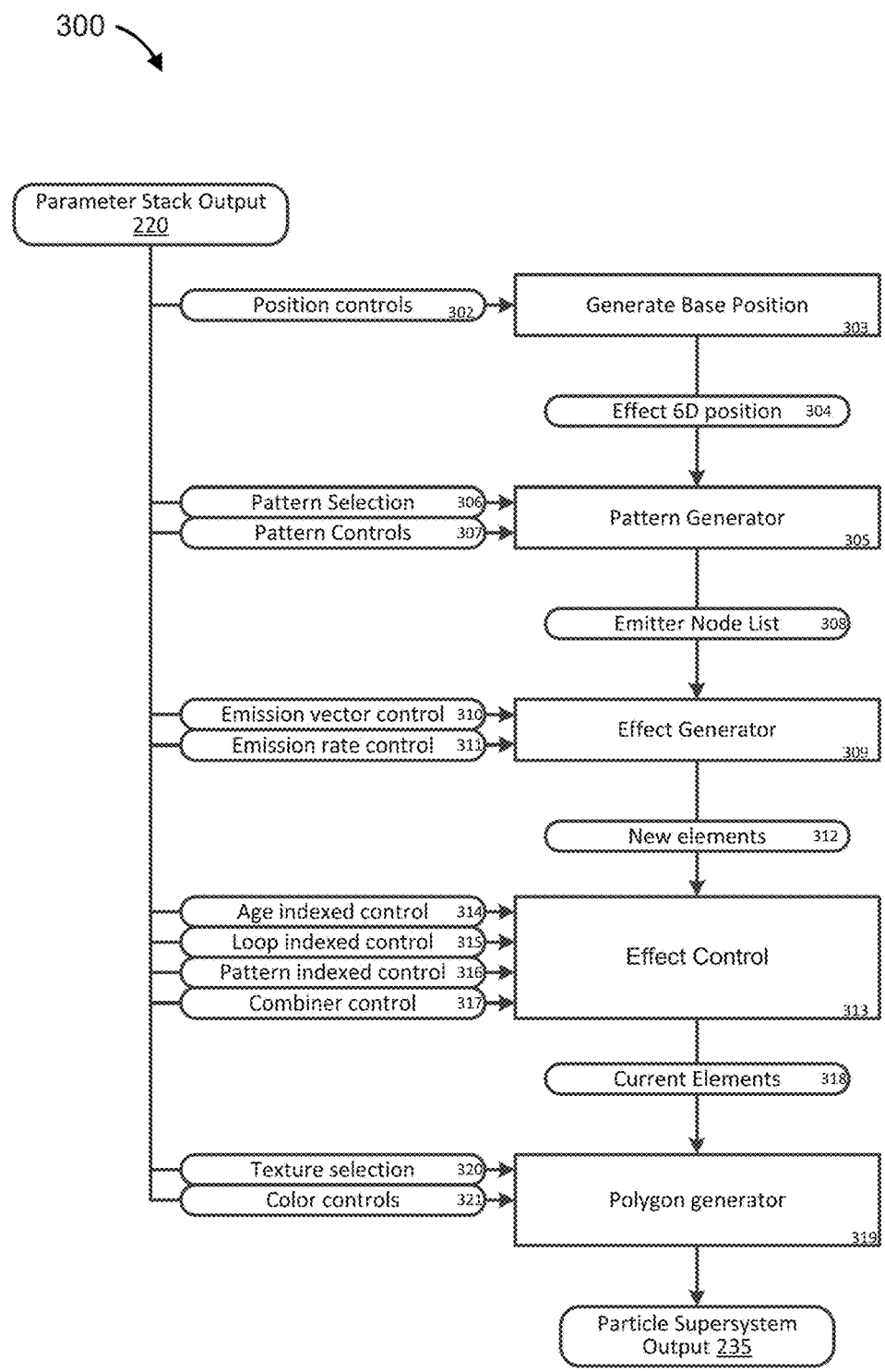
FIG. 3 shows a block diagram of an illustrative dancer effects engine for a so-called dancer visual instrument in a visual music composition, according to various embodiments.

FIG. 3 shows a block diagram of an illustrative dancer effects engine 300 for a so-called dancer visual instrument in a visual music composition, according to various embodiments. Some embodiments of the dancer visual instrument move around the scene to activate a physiological response by stimulating visual tracking of moving objects in the scene. An audience typically follows a moving object more closely than others, so that the visual instrument plays a role similar to the audio instrument that plays the melody in an orchestral arrangement. The illustrative dancer effects engine 300 of FIG. 3 is for a type of Dancer visual instrument implemented as a co-flier instrument, which generally appears to fly along with a moving camera position in a scene, as described above. The dancer effects engine 300 can be an implementation of one or more of the effects engine pre-processors 231 described with reference to FIGS. 2A and 2B.

As described above, the input to the dancer effects engine 300 can be a parameter stack output 220 associated with the dancer visual instrument, which can be generated from real-time control inputs from visual musicians and/or from pre-recorded parameter tracks (e.g., when creating an over-dubbed composition). In the illustrated implementation, the dancer effects engine 300 is implemented using a particle system, which refers generally to a computer graphics imaging technique in which a stream of particles is emitted from one or more locations. The particle system allows control over the locations from which particles are emitted; over the rate, speed, and direction at which particles are emitted from each location; over the physics that control the trajectories and movement of particles during their lifetime; over the color, opacity, and other qualities of the particles during their lifetime; over the maximum age after which older particles are removed from the system; etc. While some conventional descriptions of particle systems are limited to each particle being represented by a "billboard" (a texture map oriented so as to face the viewer), the term "particles" is used herein more broadly to include other constructions such as textures oriented in other ways or graphics approaches such as triangular meshes or individual points. Each particle may itself, in some cases, be an emitter that generates a stream of other particles.

Some embodiments of the dancer instrument are distinguished by real-time control 302 of a base position generator 303 which calculates a "6D" base position 304 of the effect, where 6D refers to location XYZ and 3 axis orientation (e.g., pitch, roll, and yaw; or the like). The base position 304 may control the location of the emitter and the emission direction of an effects generator, or it may control the center and orientation of a pattern when the effects generator has multiple emitters. The visual musician may control the position directly, such as by using sensors that detect the position and orientation of the hand and adjusting the base position accordingly. The sensor input may also be modulated and supplemented in various ways. The position and orientation may be calculated by integrating the values from movement or acceleration sensor values. The vectors may be scaled, such as to have a small rotation of the hand produce a larger rotation of the effect. An additional sensor, such as a finger or thumb control, may provide an inertial control, so that the base position follows the hand position when the sensor is pressed fully, and continues the motion when the sensor is released. A filter may reduce the jitter associated with hand movements or selectively amplify or attenuate certain types of motions. Values for one or more of the six axes may be generated algorithmically, such as by determining the output orientation as a function of the translational movement vector rather than via the hand orientation.

A pattern generator 305 can receive the base position 304 and various controls supplied by the artist that select pattern algorithms 306 and control their operation 307. A pattern can include one or more emitters arranged around the base position, where the parameters determine the number of emitters, the geometric pattern in which they are arranged and the directions in which each emitter emits particles. The dancer instrument may include more than one multiple patterns concurrently (e.g., simultaneously), each of which uses a different effects generator that is controlled by a separate set of parameters and generates a different emitter node list. A processing node that receives as input an emitter node 6D position and generates as output multiple emitter nodes at a new set of 6D positions is called an "emitter multiplier." Emitter multipliers can also be used successively, so that each emitter in the output set from the first multiplier is in turn multiplied into a second pattern.

The output of the pattern generator 305 can be an emitter node list 308, which specifies the location and direction of each emitter in the effect. Each emitter node list 308 can be sent to an effect generator 309. The effect generator 309 can determine the rate at which particles are emitted from each node as controlled by dynamic input 311, and it can determine the initial direction and speed of each particle as a function both of the node list 308 and of user emission vector controls 310. The output of the effect generator 309 can be a list of new particles or effects elements 312 to be added to the particle system, which can provides initial location, velocity vector, and other initial state values for each particle. The complexity of a single visual instrument can be increased by generating multiple emitter node lists each going to one or more effects generators 309.

The effect control 313 can determine behavior of each particle (each new element 312) that is added to the system. The behavior may include adjustments to the particle velocity vector, changes to the particle appearance, and other features specific to a particular instrument. Controls over characteristics such as color, size, or movement may be a function of index values. Age-indexed controls 314 may vary the characteristics according to the length of time since the particle was added to the system, such as to change the particle color as it becomes older. Loop-indexed controls 315 may allow the user to establish a repeating cycle of values, such as oscillating movements or flashing colors, as well as to adjust the loop duration which is the time required for each pass through this cycle. Pattern-indexed controls 316 can allow the behavior of particles to be controlled according to their position set in the pattern generator 305, such as to apply different colors or behaviors to particles that originated from different emitters in the node list 308 or were emitted in different directions. An artist can establish different controls for different indices, and can supply combiner controls 317 that specify how much each of the indices affects the particle behavior.

The output of each effect control 313 can be a list of currently active particle elements 318, which can include values controlling the shape, color, texture pattern, orientation, and other characteristics of each element. A polygon generator 319 can receive the list and use the data to create low level graphic primitives, such as texture mapped polygons. Each particle element may be represented by a single texture mapped billboard, or it might be represented in other ways, such as by individually drawn points, polygon meshes, multiple billboards, or other graphic primitives. The instrument controls that affect the polygon generator can depend on the method for representing the particle element. If a texture-mapped billboard is used, the controls may include the selection of the texture map 320 and additional color modulations 321. The format of polygon generator 319 can also depend on the representation method. If texture-mapped billboards or polygon meshes are used to represent the particle elements, the output can be a list of polygons as used in standard graphical operating systems, such as OpenGL or DirectX. The output of the polygon generator 319 can be the particle supersystem output 235, as described above.

Figure 4:
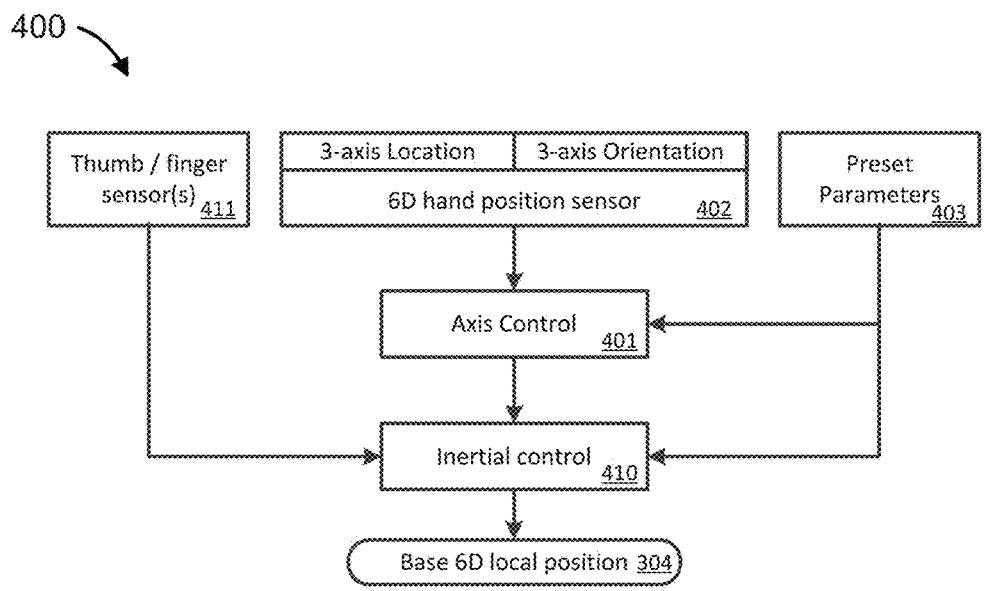
FIG. 4 shows an illustrative implementation of a base position generator to control a 6D base position.

FIG. 4 shows an illustrative implementation of a base position generator 400 to control a 6D base position (e.g., at block 303 of FIG. 3). The base position generator 400 can be (or can be included in) one of the instrument controllers 102 described above. Sensors 402 can detect the position and orientation of the artist's "trigger hand." These sensors may be provided by accelerometers or magnetic sensors attached to the hand, by optical detectors that use image processing and analysis to detect the hand position, or by other means. The axis control 401 can convert the sensor information into separate values for each of the six axes using algorithms that may be controlled by the preset parameters 403. These algorithms may include scaling the data to adjust the amount that each axes value changes in response to changes in the hand position so that for example a 180-degree pitch angle range might be achieved even though the physical range of the hand for this rotation axis might be less than 90 degrees. They may also apply different scales and offsets to the values at different locations relative to the body position, such as to compensate for a yaw orientation angle pointing toward the left as the hand position moves to the left. They may include filtering the data to smooth the responses and to reduce jitter.

In some alternative implementations, the base orientation value may be synthesized in ways not directly controlled by the hand orientation. For example, it might be calculated in part as a function of the direction of movement so that the emitter system faces in the direction that it moves, or it might be set to a fixed direction relative to the camera position or to the pattern geometry.

The scaled and filtered hand position can be sent to an inertial control 410, which can be controlled by thumb or finger controls 411. The primary control can be a variable inertia level "S," which can determine the extent to which the base position 304 is determined by changes in the hand position versus an inertial value. If the values are calculated at periodic intervals called frames that are indexed by a value "i," such that i represents the values for the current frame, the output position "P" for each position or orientation axis value can be calculated as:

$$P_i = P_{i-1} + (A_i - A_{i-1})*S + V_i*\Delta t_i*(1-S)*(1-D),$$

where:
- $P_i$ is an output value for the frame at the current index i;
- $P_{i-1}$ is an output value for the previous frame;
- $A_i$ is a hand position as calculated in the axis control at 401 for this frame;
- $A_{i-1}$ a hand position as calculated in the axis control for this component in the previous frame;
- S is a primary inertial control level set by the thumb/finger sensor 411 with a range 0-1;
- $\Delta t_i$ is a time offset between the current frame i and the previous frame i−1;
- $V_i$ is an output velocity as calculated in the previous frame$=(P_{i-1}-P_{i-2})/\Delta t_{i-1}$; and
- D is a drag configuration parameter with a range of 0 (full inertia) to 1 (no inertia).

For example, when the thumb or finger switch is fully pressed, the inertial control value S can go to '1', and the output value for each position and velocity component can be adjusted by an amount that the component was adjusted in the axis control 401 from its value in the previous frame. When the switch is released, S can go to '0', and the output value can be determined as a function of the previous position and velocity. In that case, the value can be controlled by drag parameter (D). If there is no drag, the position can continue changing at the rate from the previous frame. At a maximum drag of '1', the object can cease movement as soon as the inertial button is released. The inertial control value can vary in between '0' and '1' so as to create smooth transitions between controlling by hand position versus controlling by inertia.

Control over orientation may exploit any suitable angles or movements. For example, Euler angles can be exploited to yield yaw (rotating left/right), pitch (tilt up/down), and roll (spinning clockwise or counterclockwise). In some implementations, Euler controls can allow separate adjustment for sensitivity for the different axes, such as to compensate for the limited range of yaw and pitch rotation at the wrist compared to the large spin range. Certain implementations can permit using individual orientation axes to control other functions in the system. Some implementations can compensate for gimbal lock in representing large rotations, and/or other issues associated with Euler angles, by calculating the Euler angles as small delta offsets from the current position. For example:

InputDelta=CurrentInput*Inverse(lastInput); and

EulerDelta=MatToEuler(InputDelta), where:
- CurrentInput is a 3×3 matrix specifying the current orientation of the hand controller;
- LastInput is a value of the input matrix in the previous frame;
- Inverse is a matrix inverse function;
- InputDelta is a matrix specifying the change in orientation from the previous frame;
- MatToEuler is a function for converting a 3×3 matrix to Euler angles; and
- EulerDelta is a vector describing the rotation since the previous frame using roll, pitch, and yaw components.

The Euler delta vector produced by this transform can be well suited for scaling, filtering, and inertial transforms, as described for the axis control 401 and inertial control 410. These deltas can then be used to create the output orientation sent as a transform of the orientation from the previous frame:

OutMat=LastOutMat*EulerToMat(AdjustedEulerDelta), where:
- OutMat is a 3×3 orientation matrix sent at 412;
- LastOutMat is a value of OutMat in the previous frame;
- EulerToMat is a function for creating a 3×3 matrix from 3 Euler angles; and
- AdjustedEulerDelta is a EulerDelta vector after application of filters, gain adjustments, and inertial controls.

The Euler roll, yaw, and pitch delta values can also be used to adjust values for parameters other than orientation, such as having the spin vector control a color shift.

The use of the delta values can allow the establishment of an arbitrary reference origin. Another input signal can be used as a reset trigger which sets the value of the orientation OutMat to the identity matrix, and/or sets the position $P_i$ to 0 or other reference value. This can allow the artist to set an arbitrary hand controller position as the origin for the local coordinate system used for the Base 6D Local Position.

These position values can be supplied as the Effect 6D Position 304 to the Dancer Effects Engine 300 of FIG. 3. The values can be referenced to a local coordinate system in which for example the Z axis might represent the preferred view direction and the origin is the center of the effect. The coordinates may be transformed when the effect is added to the scene so that the final placement of the object into the scene world coordinates may have a different location and scaling from the local coordinates, and multiple instances of this effect may be added simultaneously to the scene.

Figure 5:
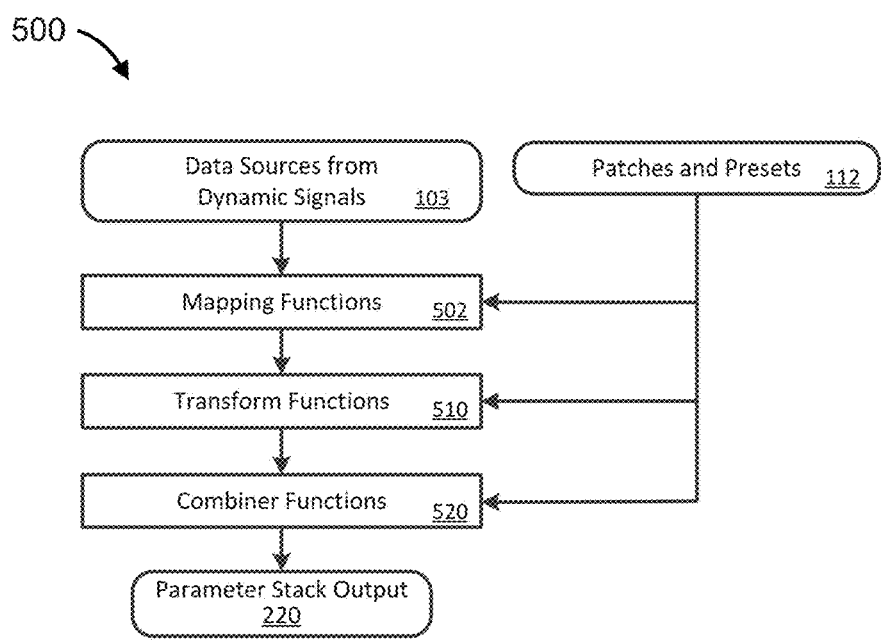
FIG. 5 shows an illustrative implementation of a partial visual music instrument construct having a set of parameter control modules that receive a set of dynamic synthesizer control inputs.

FIG. 5 shows an illustrative implementation of a partial visual music instrument construct 500 having a set of parameter control modules 210 that receive a set of dynamic synthesizer control inputs 202 (e.g., from recorded parameters 260 and/or instrument controllers 102). As described above, the synthesizer control inputs 202 can be generated by one or more hardware interfaces 201 from control signals 103 and may be affected by patches and presets 112 (e.g., created off-line in GUI 111). For example, an artist might choose from a library of partially or fully configured instruments which they can control through a common set of hardware and gestures in a manner similar to how an audio musician can select from a library of sounds for a keyboard synthesizer that use the same strategy of mapping keys to notes on a musical scale. The use of shared control paradigms across multiple visual instruments can reduce the time for motor learning as needed for proficient control of the effects in real time. The output of the parameter control modules 210 can be a parameter stack output 220, as described above (e.g., from dynamic control of effects engine pre-processor 231 values). A large number of parameters may be required to control each particle effect generator, and a single visual instrument may employ a large number of particle effect generators to produce its dynamic output. The parameter control modules 210 can determine how the physical actions of the artist affect these parameters and hence create the visual output, thereby defining the language of a visual music composition.

As illustrated, mapping functions 502 can assign the synthesizer control inputs 202 to various parameters. The value of a single parameter may be affected by multiple input signals. For example, the particle emission rate might increase both in response to a foot pedal as well as a finger position sensor. A single input signal may also affect multiple parameters. For example, a foot pedal might simultaneously increase the brightness of several effects engines as well as increasing the emission rate and the loop frequency. The values for parameters that are not mapped to any dynamic controls are specified as part of the static preset. The mapping of input signals to parameters may also be a function of other input signals or state values, so that for example at one time a foot pedal might set the brightness of one set of effects engines and at another time adjust a different set of effects engine pre-processors 231. In some implementations, the patches and presets 112 can specify a single mapping of input to outputs, or a set of rules and functions that allow mappings to be changed as part of artists' dynamic input.

Transform functions 510 can generate outputs (e.g., "f(x)"), which define a value that the artist wishes to apply to a specific parameter as a result of an input value (e.g., "x") from the mapping function 502. A simple linear transform might increase the output value proportionally to the input value, while other types of transform functions 510, such as exponential or inverse functions, might be used for other parameters. The artist may also create programmable transform functions 510 that establish arbitrary values of outputs in response to different input values, such as by varying the transform function 510 as the input value increases. A single input signal may be mapped to multiple parameters and use a different transform function 510 for each instance. For example, pressing on a finger sensor might cause a brightness level to increase linearly, a particle emission rate to increase exponentially, and a delay time to decrease. A mapped dynamic signal may be processed by multiple transform functions 510 selected from a library of configurable transform functions 510. Embodiments of the patches and presets 112 can specify the patching of each input signal through the transform functions 510 used for its contribution to an output parameter, as well as specifying the configuration values for each transform function 510, such as gain levels, offsets, and timing and filter values.

A combiner 520 can be used, for example, when a single value of the parameter stack output 220 is controlled by multiple input signals, where each input signal is being processed by a separate set of transform functions 510 specific to its use with respect to this parameter. Simple combiner 520 functions might add or multiply the inputs, such as to create a brightness level by multiplying a base level specific to a parameter by master gain level applied to many parameters. Any other suitable types of combiner functions 520 can be used, such as a mix function that sets the output parameter value as a blend of two signals A and B, where a third signal controls the relative contribution of A versus B.

Figure 6:
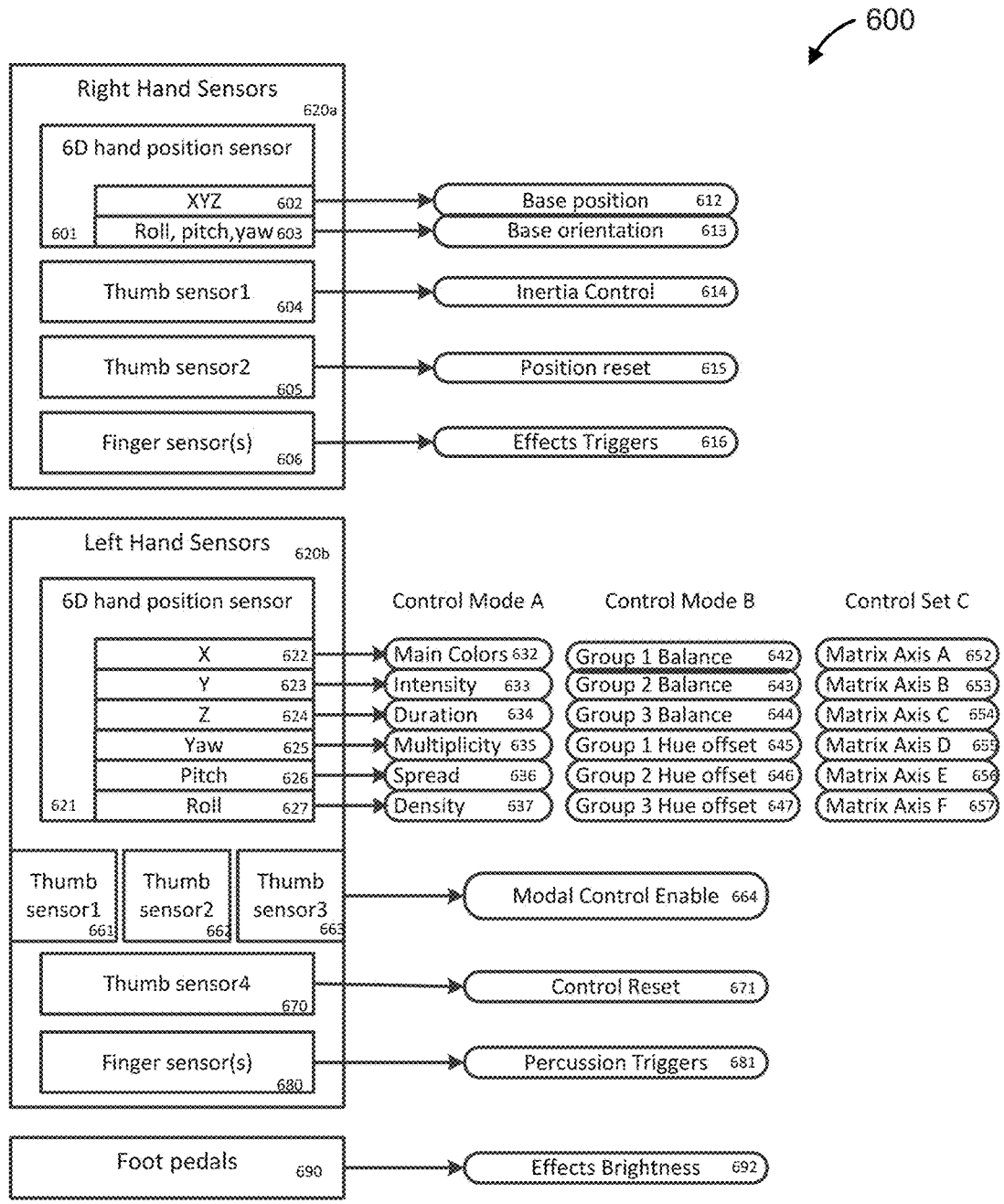
FIG. 6 shows an illustrative mapping of sensors to parameters when creating an illustrative class of dancer visual instruments.

The parameter control modules 210 facilitate use of a sensor input to control synthesizer parameters in many different ways. For example, each configuration of patches and preset 112 parameter values can effectively create a different visual music instrument 211 optimized for creating different types of effects. For example, FIG. 6 shows an illustrative mapping 600 of sensors to parameters when creating an illustrative class of dancer visual instruments. This mapping 600 can provide a universal framework for controlling a diverse range of effects. Thus, the mapping strategy for the programmable interface can define a visual music language, as it specifies a framework through which the actions of the artist affect the visual environment.

As shown, the Dancer mapping 600 can use the left and right hand sensors 620a,b in a complementary arrangement (e.g., similar to how a guitarist may use two hands together to perform different types of actions on strings). The mapping also uses foot pedals to adjust brightness levels in a manner similar to the use of volume pedals for electronic audio instruments. The right hand can function as the envelope trigger hand. The 6D sensor 601 detects the position 602 and orientation 603 which adjust the base position 612 and base orientation 613 (e.g., as shown in FIG. 4), with thumb sensor 604 adjusting the inertial control 614 and thumb button 605 resetting the origin 615 (e.g., as in FIG. 4).

The right hand finger sensors 606 can be used as triggers for different particle effects 616. The sensors can be constructed with a spring loaded return so that they return to the off position when released and so that increasing pressure provides haptic feedback for the sensor position. An advanced controller, such as described in above-referenced U.S. Pat. No. 9,389,684, can provide one or two independent linear control axes for each finger (e.g., each of four fingers). A simpler instrument might provide a single linear sensor that could control a single effect or use additional buttons to select which of several effects is currently controlled by the linear control.

For example, referring to FIG. 3, as the finger sensor output increases, the amount of the effect is increased by increasing the emission rate 311 of one or more particle engines. Increasing sensor values can also be used to increase particle emission speeds as part of the controls shown at 310, increase the maximum age of particles as part of 314, increase the brightness as part of the color controls 321, or adjust other parameters that enhance the sensation of having more of that effect in the scene. In some implementations, transform functions 510 of FIG. 5 can be adjusted so that the different parameters controlled by the sensor are modulated in nonlinear ways, such as to make a parameter become active in a particular range of input sensor values. These mappings can allow multiple parameters to be affected differently as the sensor is adjusted through its range. The artist can associate the pressing of a sensor with introducing more of an effect into the scene, but the single sensor can be mapped within the synthesizer to multiple parameters on multiple particle engines. The visual musician is working in the framework of a language in which one element is adding more of an effect into a scene, without needing to be aware of how the instrument designer may be converting the pressing of the finger sensor into a complex sequence of controls over many different parameters in multiple effects engines. These mappings can be different for different types of dancer visual instruments, while maintaining a universal control framework for the artist, so that the motor learning acquired through practice on one dancer instrument is applicable to other instruments in this class. The assignment of thumb versus finger controls for the inertial parameters and effects triggers on the right hand controller can also be adjusted to work optimally with different controller hardware. The motor learning would be different in these cases, but an artist using the same hardware would experience a common set of responses across multiple instruments within the class.

The left hand sensors 620 can control the characteristics of the effects that are triggered by the right hand. In one implementation, the 6D position sensor 621 is used to create a continuous multi-dimensional control space wherein the position on each axis can be used to control a different set of parameters. The position values are typically adjusted only when an enable button is pressed, so that releasing the button prevents inadvertent adjustments and so that the control range can be extended by ratcheting the controls. A control axis can represent a high level concept that can applied to different instruments so that the motor learning acquired when practicing one instrument reduces the time to develop expertise in using other instruments sharing that paradigm. Separate configurations can support different levels of expertise. Novice users may control one or two axes, while using preset values for the other controls. Expert users may be able to control up to six axes independently, so that a single gesture can potentially affect many different sets of parameters simultaneously. The primary control axes are the XY position, which are used for the most important and universal controls. The other axes can be employed by the expert users to expand their control set to include more subtle types of control or to include parameter sets specific to a particular instrument.

In one implementation, the X axis 622 is used for the master color control 632. The leftmost position selects one set of color values affecting most if not all of the colors generated by the instrument. This color set can be preconfigured in an offline process that sets the various color values for each of the effects engines. The rightmost position selects an alternative set of colors, and positions in between create color values that are interpolated between these two pole positions. One possibility might be to set a "cold" set of hues on the left and 'warm' colors on the right, which forms a paradigm that is easily understood and controlled. The designer of an effect can select different pairs of color values for different elements in the system, with care to insure that the combinations are pleasing not just at the end points, but also at the interpolated points in between. The X-axis may not be the only vector for adjusting colors, as it may be supplemented by additional controls such as group brightness levels or secondary hue shifts, but it is the primary control, so that a single universal action instantly adjusts the overall color set generated by the instrument. The color sets used at each pole can also be replaced with other preset configurations, so that different color control arrangements can be created for the same instrument.

The Y position 623 can control the "intensity" axis 633, where intensity refers to an emotional energy level so that low values produce effects that might be described as gentle and calm, while high values might evoke adjectives like frantic and chaotic. Referring again to FIG. 3, the low intensity effects might set low rates for the oscillators controlling the loop indexed controls 315, slower emission velocities 310, and textures 320 that have smoother edges and lower frequency color transitions. As the Y value increases by small amounts, the internal parameters of the displayed particle engines such as the emission speeds and oscillator frequencies in the effects engines might be increased. The transition to higher intensity levels may also be achieved by blending between different effects engines optimized for different intensity levels.

The Z position 624 can control the duration axis 634. This primarily controls the duration of the particle lifetimes and the associated age indexed behavior 314. Each particle engine may have a different minimum and maximum age level, as well as a different transform function 510 for the level as a function of the sensor value. When the duration is high, the lifetime of articles is extended so that the overall number of particles in the scene increases and the age-related events take place at a slower rate although loop-triggered events may continue at high frequencies. Conversely, a lower duration creates a sparser image that emphasizes the movements of the base position.

The orientation sensors 625-627 can be mapped to parameters affecting the geometry of the effects being synthesized. The implementation of these controls vary according to the types of effects being controlled, but they are organized into general categories so that the gestures learned by the artist for controlling one type of dancer serve the same general function in other implementations. Orientation sensors are also more difficult to control, as the hand has a limited range of rotational movements and the values can change as unintended by-products of positional movements. Static configuration parameters can be used to limit or disable these controls for novice users.

The orientation sensors can create a continuous multidimensional control space for shapes wherein each possible orientation produces a unique shape. Organizing the controls using three rotation axes make it easier for the artist to anticipate and control the shape changes that result from various orientations. Each axis can be assigned to control a separate set of parameters. These assignments may vary as needed to provide the most expressive control of an effect, but following a common set of principles allows the artist's motor learning from playing one set of effects to be applied to other configurations.

One implementation can use assignments that provide expressive control over a wide range of effects. For example, the yaw axis 625 controls multiplicity 635, which refers to the number of repetitions of a pattern element within the larger system. One example of a multiplicity control would be to vary the number of radial repetitions of a particle emission pattern, so that a low level might produce two reflections 180 degrees apart, while a high level might produce sixty reflections, each six degrees apart. The pitch axis 626 can control "focus," which can refer to concentrating the shape into a smaller range. One example of this might be to adjust a spray angle at which particles are emitted, so that the pattern varies from a narrow beam up through a broad sheet. The roll axis 627 adjusts the size of particles 637 within the current shape, so that counter-clockwise rotations reduce element sizes producing smaller pinpoint light sources while clockwise rotations expand the sizes which fills the spaces between elements.

Thumb Sensor1 661 on the left hand can be used as an enabling control 664, so that the colors, intensity, duration, and shape are only adjusted when the sensor is pressed. Similarly, Thumb Sensor4 670 can be used as a reset control 670 which sets all parameters to default values. Additional thumb sensors can be used to enable the adjustment of different parameter sets or other types of controls. In one implementation, the Thumb Sensor2 662 can be used as an enabling control for an alternative mapping of the six axes to the effects parameters shown as Control Mode B. In this mode, the effects engines are divided into three groups for which are provided independent balance and hue controls. The balance controls 642, 643, 644 can adjust the extent to which each group of effects appears in the scene, which may be done by adjusting the brightness and opacity levels so that the group of effects fades in or out. The hue controls 645, 646, 647 can allow the hues of the colors in each group of effects to be shifted away from the color set associated with the main system color set that was specified by the main color controls 632. At the default settings, the colors are fully specified by the master controls 632. A yaw rotation 625 shifts the colors 645 of "Group 1" away from these default levels toward a second set of colors, such as by rotating each hue within the hue/saturation/intensity (HSI) color space.

The thumb sensors can also be used to enable other types of control paradigms. In one implementation, ThumbSensor3 663 is used to enable the loading of preconfigured presets where the position and orientation axes define a multidimensional matrix 652-657, where each node selects a set of preset values and specifies how those presets should be loaded into the current environment. Some nodes can define a completely different instrument, replacing every parameter and patch with new values that effectively load a completely different visual instrument. Other nodes might define a group of effects that can replace a group within the currently active set, so that some of the current effects are unchanged while others are replaced with the new effects. Still other nodes might be used to select a new set of configuration values for one or more of the currently loaded effects, such as to change the color sets used at the poles of the main color control 632.

The finger sensors on the left hand 640 can be used to trigger percussion effects 650, such as a short burst of particles that produces a sparkle or explosion-like event. The amount of control that can be achieved depends on the hardware. Having multiple sensors allows different types of effects to be triggered. If a sensor is sensitive to pressure, the value might be used to adjust the intensity of the effect. If a sensor is sensitive to position or direction, the position or direction might be used to control aspects of the shape of the effect.

The foot pedals 690 control the brightness levels 692 for different effects. One implementation provides multiple pedals, so as to provide independent control over the different effects triggered by the right hand finger sensors. The brightness control over multiple effects can be mapped to a smaller number of foot pedals by assigning groups of effects to each available pedal.

While various particular control implementations are described herein, these are intended only to provide illustrative control types, control parameters, control techniques, etc., and are not intended to limit the scope of alternative approaches. Visual elements of a visual music composition can evoke different macro-level visual effects that can be comparable, for example, to the auditory effects of melodic, harmonic, percussive, and other participants in a musical composition. For example, one visual instrument in the composition can evoke a melodic type of feel to the audience, while another visual instrument can evoke more of a percussive type of feel to the audience. Together, the instruments can form a "concert" effect of melody in context of rhythm, and/or other such analogs.

To such an aesthetic end, it can be desirable to provide a visual music system that is sufficiently capable to enable artistic expression at least analogous to the types of expressions available to musicians. For example, as with audio music, it can be desirable for a single visual music instrument to be dynamically controllable to have both percussive and melodic properties by conceptually mapping audio concepts, like "envelope" (e.g., attack, decay, sustain, and release, or the like), to visual concepts, like brightness, color, size, movement, location, etc. The following table provides an illustrative conceptual mapping as one example of desirable control capabilities of an illustrative visual music instrument.

| Property | Percussive Effect | Streaming Effect |
| --- | --- | --- |
| Audio Analogy | Drum Beat | Melody Line |
| Attack Stage | Flash | Gestures |
| Latter Stages | Defined Shape | Accumulated Patterns |
| Duration of Emission | Short Burst | Continuous Under Dynamic Control |
| Initial Direction/Velocity | Defined by Pattern | Dynamic and Expressive |

In the mapping shown in the table, a particular visual music instrument has both percussive visual effects (analogous to percussion in audio instruments) and streaming visual effects (analogous to melodic audio instruments). For a percussive effect, particles can be emitted in a short burst similar to how a drum might be struck; while for a streaming effect the particle emissions are continuous under the dynamic control of the artist in a manner similar to how the bow of a violin can create a continuous audio envelope. For a percussive effect, the directions and velocities of the particles are defined by a pattern set by parameters when the burst is triggered; while for a streaming effect, the artist constantly adjusts particle directions and velocities as the melody is played. For a percussive effect, the pattern presented to audience is largely determined by a single set of parameters sampled at the time the burst is triggered; while for a streaming effect, the patterns are often accumulated over time depending on the particle lifetimes, in a manner somewhat like skywriting via airplane contrails. The above conceptual mapping is intended only as one example, and many other mappings are possible.

Figure 7:
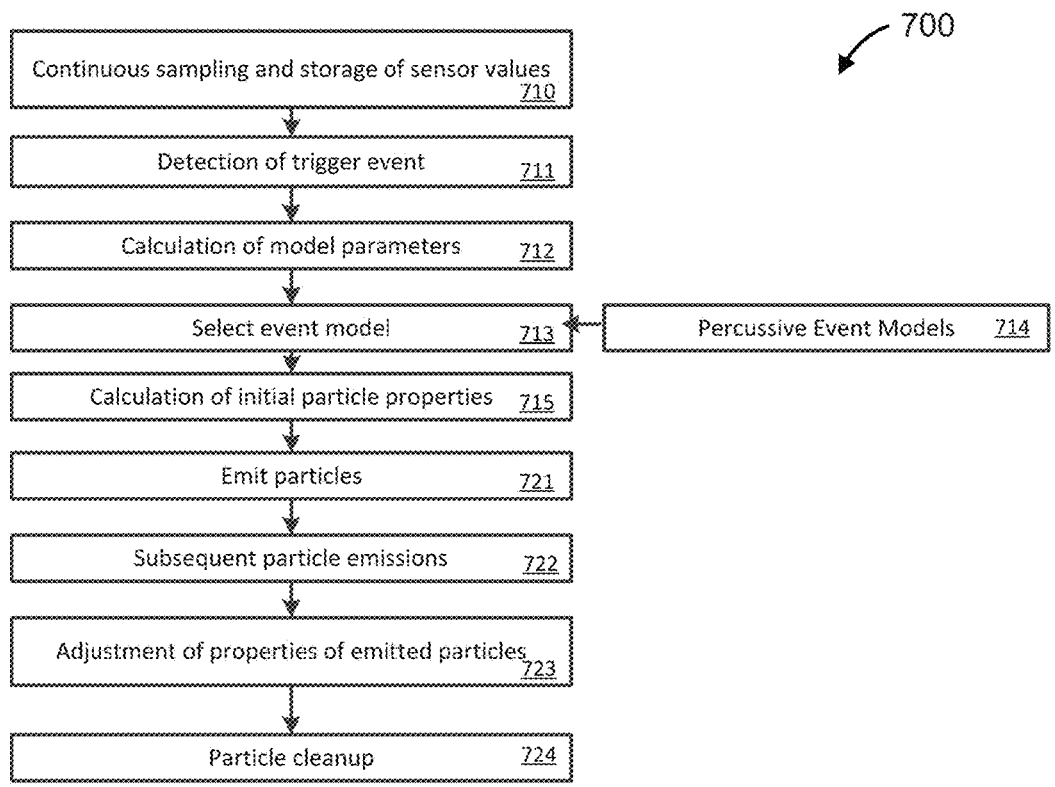
FIG. 7 shows an illustrative flow diagram for a method of generating a percussive visual effect, according to various embodiments.

FIG. 7 shows an illustrative flow diagram for a method 700 of generating a percussive visual effect, according to various embodiments. Each percussive event creates a pattern that emerges from the instrument base position (e.g., base position 304 of FIG. 3) and spreads out into a pattern that is defined by the parameters in effect at the time the effect is triggered. At stage 710, embodiments can continuously sample and store a subset of the sensor values. This allows calculation of values such as velocities and acceleration at the time of the event trigger, so that for example, the inflections of hand movements prior to the trigger event can be used to shape the effect. The event is triggered at stage 711, when a switch is enabled or when a sensor value exceeds a set threshold (e.g., as described for the left hand finger sensors 680 of FIG. 6). In response to the trigger, initial parameters controlling the event can be calculated at stage 712 from the sensor data, from preset values, and from velocities and accelerations calculated using the stored sensor values.

The parameters may select the particle system to be triggered at stage 713 so that the artist has a choice of different percussive effects. Percussive event models can be constructed at stage 714 to generate a particular three-dimensional pattern at a target time. While all particles may start from a same base position, the direction, velocity, and other properties of each particle can be adjusted so that it occupies a different position at the target time, which allows the desired pattern to appear at the target as a composite result of all the particles. Such a technique can manifest a similar visual effect to that of fireworks display patterns.

The event parameters extracted from the sensors and preset values can be used to calculate initial particle properties at stage 715 by adjusting various characteristics of the effect such as texture and color as well as parameters specific to the particular model being triggered. Adjusting the initial velocities for all particles proportionately can allow the size of the pattern at the target time to be controlled by the artist. Similarly, applying the same rotational transform to the velocity vectors for all particles can adjust the orientation of the pattern at the target time.

The initial burst of particles can be emitted at stage 721. Depending on the selected effect model (e.g., from stage 714), all particles may be emitted in the single video frame at which the effect is triggered, or additional particles can be emitted in subsequent frames at stage 722 (e.g., as long as the trigger sensor remains above the trigger level). Emitting in a single frame or short burst creates more of a percussive accent and also allows the pattern to be more focused if the base position is moving or rotating. After emission, the appearance and behavior of particles can be modulated at stage 723 according to parameters that are set by the model or are under real time control. The time interval between emission and the target time can be similar in effect to an audio "attack" time, and can be characterized by higher brightness levels to emphasize the trigger time. At the end of the attack time a variable amount of braking may be applied. At maximum braking levels, the particle velocities may drop to zero at the target time, in which case the target pattern is a fixed shape subject only to subsequent forces such as gravity. At zero braking, the particles do not slow, and the pattern continues to increase in size as a result of the continued expansion from the original base position. At the target time, the perceived brightness reaches its maximum levels as a result of the combination of the peak brightness and expanded size. Afterward, the decay stage begins, and the brightness levels are typically reduced. The particle trajectories may be subject to subsequent forces such as gravity and properties like color and internal clocks may remain under dynamic control of the artist. The particles can be removed at stage 724, for example, as they reach their defined maximum age.

It will be appreciated that complex visual effects can be generated using embodiments described herein, and that it can be desirable to provide real-time access to those complexities via usable instruments (e.g., instruments not so overcomplicated as to be effectively unusable). For example, embodiments can include a method for multi-dimensional matrix selection via a human interface device (e.g., an instrument controller). The method can include first detecting a matrix select start signal from the human interface device, the human interface device comprising multiple controllers, each assigned to at least one of multiple control parameters. The method can second detect one of multiple matrix selection gestures in at least three dimensions from the human interface device, the matrix selection gesture spatially corresponding to a virtual selection matrix defined in the at least three dimensions, the matrix selection gesture received subsequent to the first detecting. The method can third detect a matrix select end signal from the human interface device received subsequent to the second detecting. In response to the third detecting and as a function of a mapping stored in association with the matrix selection gestures, the method can assign at least one of the control parameters to at least one of the controllers.

In some implementations, the method can fourth detect a present location of the human interface device in a virtual 3D space in response to the first detecting (e.g., detecting an "origin position" for the gesture as the position and orientation of the instrument controller when the matrix start signal is activated). The virtual selection matrix can include multiple 3D spatial selection locations in the virtual 3D space located relative to the present location. In such cases, the second detecting can include detecting an updated location of the human interface device in the virtual 3D space, and mapping the updated location to one of the plurality of 3D spatial selection locations (e.g., detecting the gesture in relation to the origin position). Different numbers and/or extents of axes can be considered in the gesture detection, which can increase the number of selection options available to the user, but can increase complexity of use. For example, the 3D spatial selection locations can include at least eight 3D spatial selection locations corresponding to corners of a 3D cube located in the virtual 3D space relative to the present location (e.g., only 3-axis control, each axis only having two possible values, resulting in a two-by-two-by-two selection matrix). Alternatively, the 3D spatial selection locations cam include at least twenty-seven 3D spatial selection locations corresponding to a three-by-three-by-three grid located in the virtual 3D space relative to the present location (e.g., still using only 3-axis control, but with higher control fidelity). Other implementations can add a fourth, fifth, and/or sixth dimension to the selection. For example, moving the controller to a particular location while rolling the controller clockwise and pitching the controller up may correspond to a particular selection.

Figure 8:
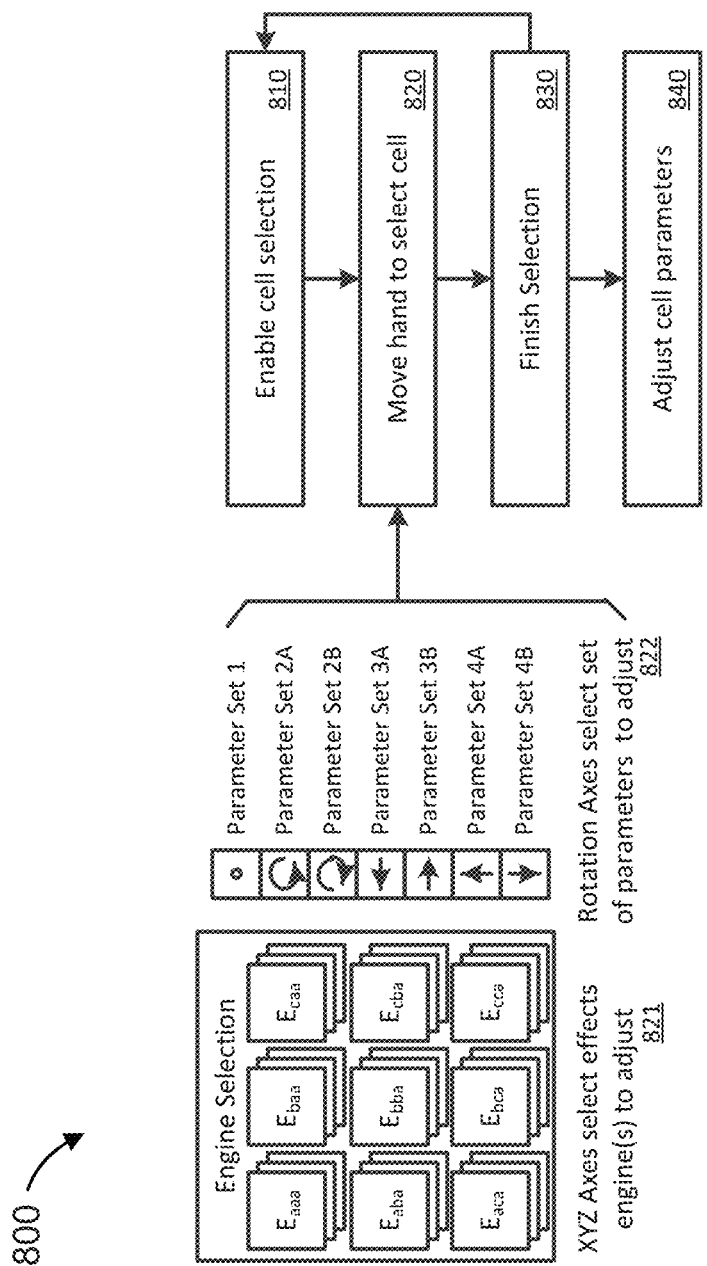
FIG. 8 shows such an illustrative instrumental approach for providing access to complex sets of parameters in real time, according to various embodiments.

FIG. 8 shows such an illustrative instrumental approach 800 for providing access to complex sets of parameters in real time, according to various embodiments. The illustrative approach assumes that each of a number of effects engine pre-processors 231 can be controlled by multiple parameter sets. For example, nine effects engine pre-processors 231 having of seven parameter sets can yield sixty-three parameter sets, each potentially providing access to multiple parametric controls. At stage 810, a user can enable cell selection (e.g., by pressing and holding a switch). While enabled, the user can perform a particular set of motions that corresponds to a two-step selection for a parameter set at stage 820. For example, as illustrated, the user can move a controller to one of nine XYZ locations (e.g., the eight vertices and the center point of a cube in space, for example, relative to the position of the controller in space when cell selection was enabled) to select the effects engine at 821; and, while in that XYZ location, the user can move the controller in one of seven Euler orientations (e.g., stationary, pitch up, pitch down, roll clockwise, roll counter-clockwise, yaw right, yaw left) to select a respective parameter set for that effects engine at 822. At stage 830, the selection can be finished (e.g., by releasing the switch). In response to finishing the selection, at stage 840, the system can switch into a configuration that allows for control of one or more parameters of the parameter set of the effects engine.

Figure 11A:
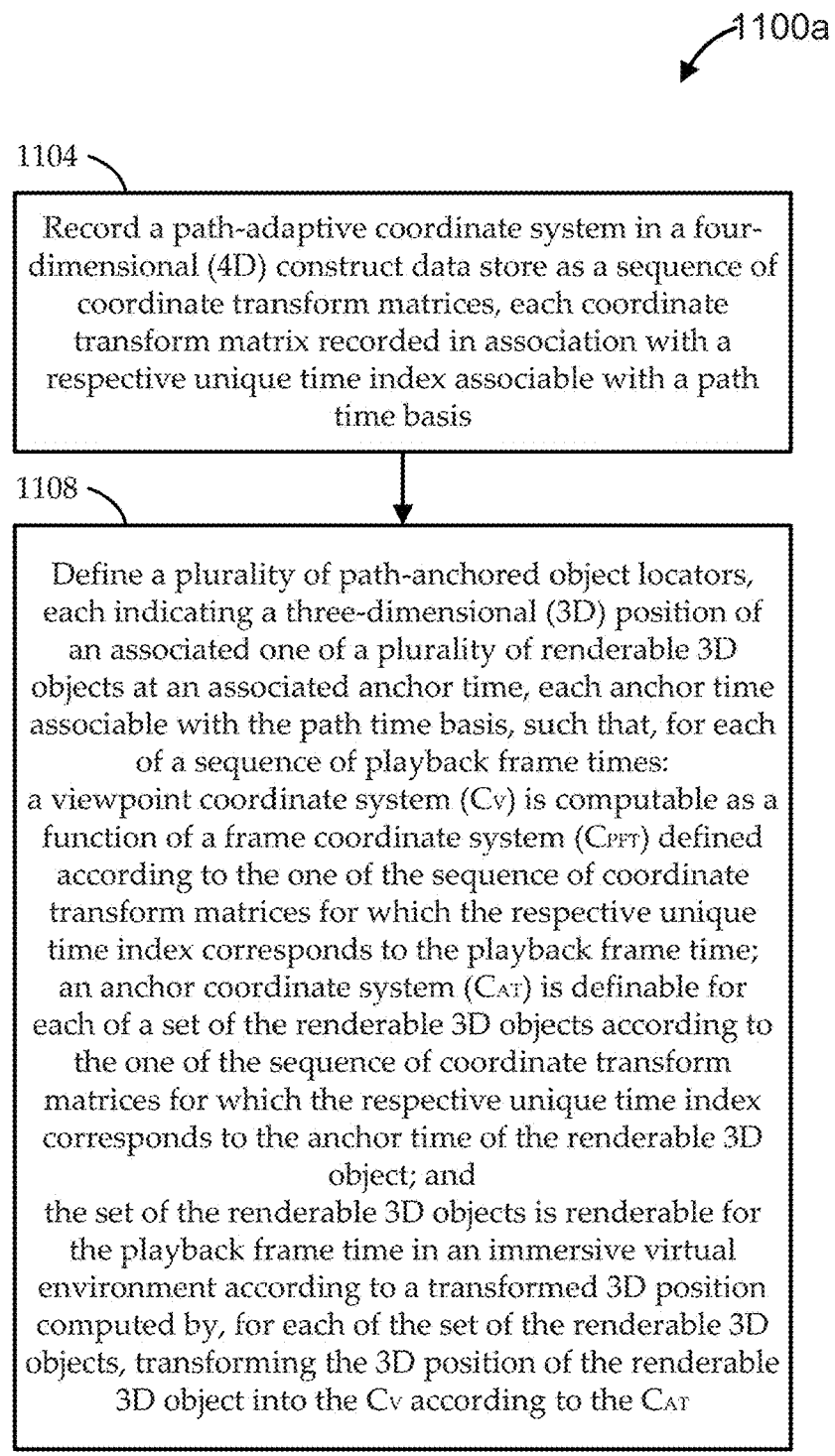
FIG. 11A shows a flow diagram of a method for generating four-dimensional path-adaptive immersive video, according to various embodiments.

As described above, various embodiments use four-dimensional path constructs to anchor renderable 3D objects in a compositional space-time. FIG. 11A shows a flow diagram of a method 1100a for generating four-dimensional path-adaptive immersive video, according to various embodiments. Embodiments of the method 1100a can begin at stage 1104 by recording a path-adaptive coordinate system in a four-dimensional (4D) construct data store (e.g., construct data store 1015 of FIG. 10) as a sequence of coordinate transform matrices. In such a construct, each coordinate transform matrix can be recorded in association with a respective unique time index associable with a path time basis. At stage 1108, multiple path-anchored object locators can be defined. Each can indicate a 3D position of an associated one of multiple renderable 3D objects at an associated anchor time, each anchor time associable with the path time basis. The method 1100a can ensure that such a path-adaptive coordinate system and such path-anchored object locators provides certain features for each of a sequence of playback frame times. One such feature is that a viewpoint coordinate system ($C_V$) is computable as a function of a frame coordinate system ($C_{PFT}$) defined according to at least one of the sequence of coordinate transform matrices for which the respective unique time index corresponds to the playback frame time. Another such feature is that an anchor coordinate system ($C_{AT}$) is definable for each of a set of the renderable 3D objects according to at least one of the sequence of coordinate transform matrices for which the respective unique time index corresponds to the anchor time of the renderable 3D object. And another such feature is that the set of the renderable 3D objects is renderable for the playback frame time in an immersive virtual environment according to a transformed 3D position computed by mapping the 3D position of the renderable 3D object from the $C_{AT}$ to the $C_V$.

Figure 11B:
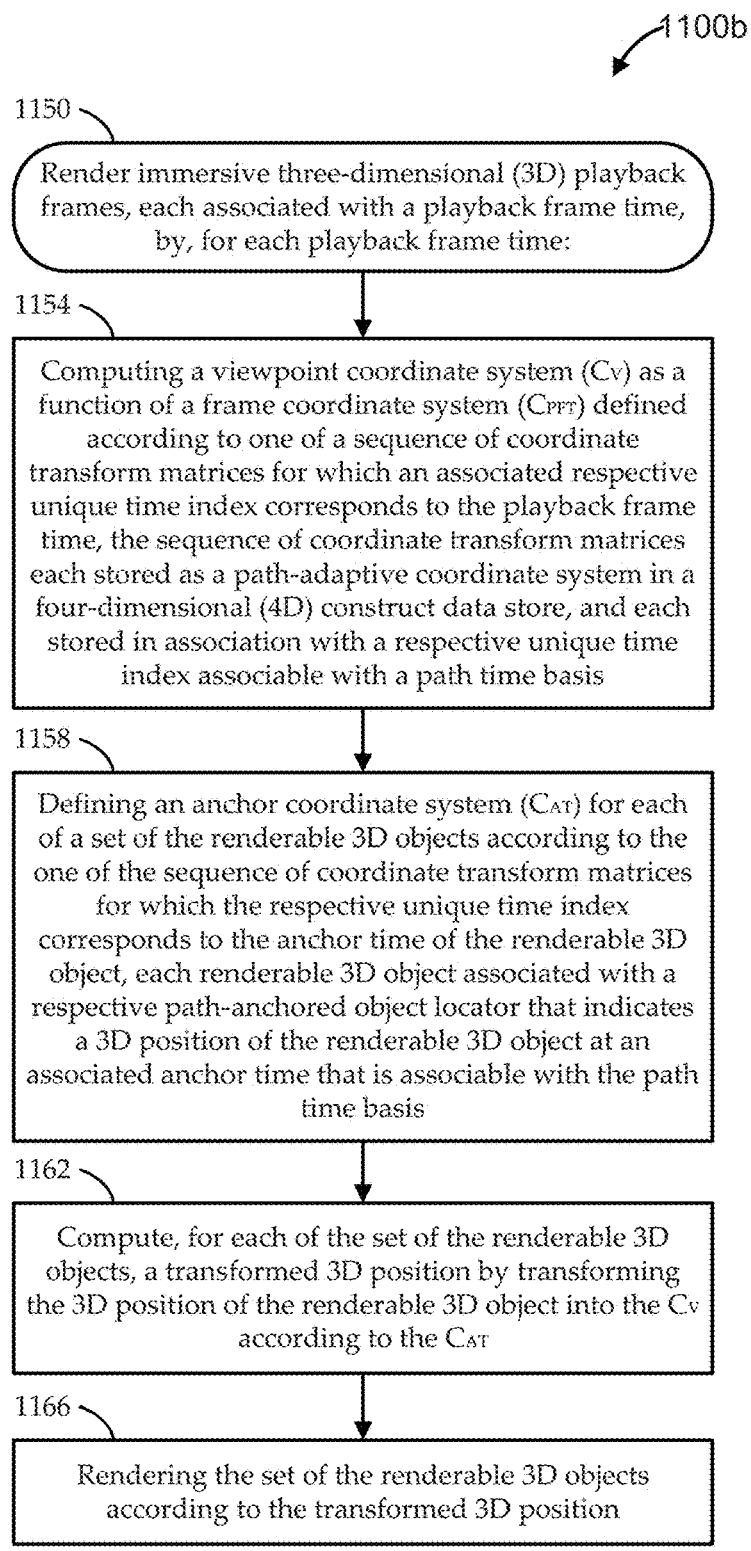
FIG. 11B shows a flow diagram for a method for rendering four-dimensional path-adaptive immersive video, according to various embodiments.

FIG. 11B shows a flow diagram for a method 1100b for rendering four-dimensional path-adaptive immersive video, according to various embodiments. Embodiments of the method 1100b begin at stage 1150 by rendering immersive 3D playback frames, each associated with a playback frame time. For each playback frame time, such rendering can include a number of steps, such as those illustrated by stages 1154-1166. At stage 1154, embodiments can compute a viewpoint coordinate system ($C_V$) as a function of a frame coordinate system ($C_{PFT}$) defined according to at least one of a sequence of coordinate transform matrices for which an associated respective unique time index corresponds to the playback frame time. As described above, the sequence of coordinate transform matrices can each be stored as a path-adaptive coordinate system in a four-dimensional (4D) construct data store, and each stored in association with a respective unique time index associable with a path time basis. At stage 1158, embodiments can define an anchor coordinate system ($C_{AT}$) for each of a set of the renderable 3D objects according to at least one of the sequence of coordinate transform matrices for which the respective unique time index corresponds to the anchor time of the renderable 3D object, each renderable 3D object associated with a respective path-anchored object locator that indicates a 3D position of the renderable 3D object at an associated anchor time that is associable with the path time basis. At stage 1162, embodiments can compute, for each of the set of the renderable 3D objects, a transformed 3D position computed by mapping the 3D position of the renderable 3D object from the $C_{AT}$ to the $C_V$. At stage 1166, embodiments can render the set of the renderable 3D objects according to the transformed 3D position.

Various embodiments enable operation of visual music system functions in 4D constructs, including the path-adaptive coordinate system and path-anchored object locators, for live solo performance, live ensemble performance, recording, overdubbing, playback, etc. In some contexts, one or more users can provide different types of interaction information. For example, one visual musician 101 can play and record a path, an arranger 120 can place various objects (e.g., range placement objects, terrain objects, visual music instruments, etc.), and another visual musician 101 can play a co-flier dancer object. In some live performance contexts, and the like, some such interactions can be received by the visual music system concurrently and/or various interactions can be dependent on leading information from other interactions. For example, some implementations can receive path information at least a minimum threshold in advance of receiving other interaction information to ensure the path is available for object anchoring; while other implementations can estimate or predict future path information for use in pre-anchoring (which can be updated when those estimated portions of the path are recorded); and still other implementations can anchor objects without path information and can map the anchoring to the path when the information becomes available.

Figure 12:
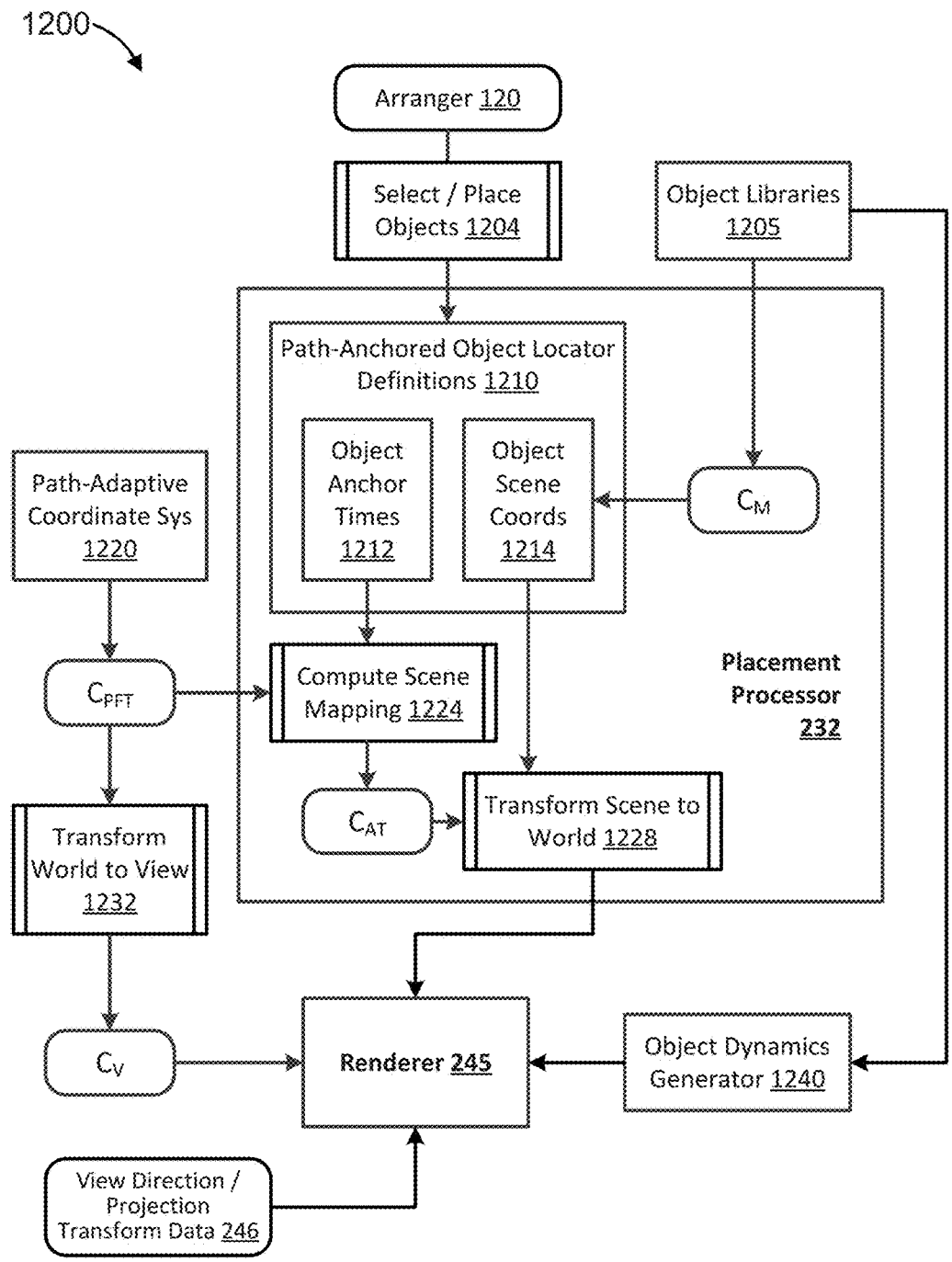
FIG. 12 shows an example 4D scene rendering environment, according to various embodiments.

FIG. 12 shows an example 4D scene rendering environment 1200, according to various embodiments. The four-dimensional path-adaptive modeling constructs described herein provide a novel framework for modeling, rendering, experiencing, and/or otherwise interacting with a 3D virtual environment. For example, 3D-renderable objects (e.g., particle systems, 3D models, etc.) are defined and stored in object libraries 1205 according to a model coordinate system ($C_M$). For example, the $C_M$ is the coordinate system in which the model is created (e.g., in 3D modeling software) and/or where its properties (e.g., emitter and particle properties for particle systems, animation properties, kinematic properties, texture maps, etc.) are defined. Embodiments seek to enable placement of the objects into a compositional space-time that can be tied to a 4D path. As illustrated, at some stage 1204, an arranger 120 can select one or more objects from the object libraries 1205 for 4D path-anchored placement. In some embodiments, rather than selecting objects individually, the libraries 1205 can include object sets, scenes (e.g., multiple different objects in relative 3D arrangement with each other), etc. As described above, placement of the objects at stage 1204 can involve defining path-anchored object locators 1210 for the objects. The path-anchored object locator 1210 for each object can define object scene coordinates 1214 for the object and an anchor time 1212 for the object. In effect, the path-anchored object locators 1210 define where the arranger 120 wants each object to be located in a rendered scene at a particular time (e.g., relative to a path-defined coordinate system at that time). In some implementations, the anchor time 1212 is view-centric. For example, objects are placed according to where the arranger 120 wants them to be when they are closest to the viewer (e.g., at a front plane of the view frustum). In other implementations, the anchor time 1212 is composition-centric. For example, objects are placed according to where the arranger 120 wants them to be at a particular time in the composition (e.g., one minute into the piece, etc.).

As described above, a path is defined in four dimensions as a path-adaptive coordinate system 1220. For example, the path-adaptive coordinate system 1220 is a sequence of coordinate transform matrices in a homogenous coordinate system, each associated with a unique time index. At any particular playback frame time, one or more of the coordinate transform matrices (e.g., an interpolation between path samples) can be used to compute a frame coordinate system ($C_{PFT}$). At stage 1224, the object anchor times 1212 for the placed objects can be used to determine a scene mapping as an anchor time coordinate system ($C_{AT}$) (e.g., the $C_{AT}$ corresponds to what the $C_{PFT}$ will be when the anchor time is reached in the path time basis). At stage 1228, the placement coordinates 1214 for the objects and the $C_{AT}$ are used to transform the scenes (e.g., the objects) into a global coordinate system (e.g., "world" coordinates). The transformed object placements can be passed to the renderer 245 (which may or may not render all objects, for example, only rendering objects determined to be within a present view frustum, etc.)

The $C_{PFT}$ matrices can also be used, at stage 1232, to transform world coordinates to a particular viewpoint coordinate system ($C_V$) for each playback frame time. The $C_V$ can have an inverse relationship with the $C_{PFT}$ matrices in that it can be used to transform the world coordinates from the effects engine into camera coordinates at the current time, while the $C_{PFT}$ matrices can be used to convert the local scene coordinates into world coordinates. This inverse relationship can allow the arranger to construct scenes based on how they will appear in the camera view at the anchor time. As described above, the $C_V$ can be computed from one of the $C_{PFT}$ matrices, or from an interpolation of multiple of the $C_{PFT}$ matrices, to account for a horizon point, or in any other suitable manner. Embodiments of the renderer 245 can use the $C_V$ (e.g., or the inverse matrix) to anticipate future views and construct a present scene based on those. In some embodiments, the renderer 245 also receives view direction and/or projection transform data 246. For example, display drivers, display system feedback (e.g., head position, etc.), and/or other information can be used to generate a view direction transform, a view direction offset, a projection transform (e.g., skewing, etc. for domes or other displays), etc. Such view direction and/or projection transform data 246 can be used by the renderer 245 further to render a particular frame at a particular time. Some embodiments also include an object dynamics generator 1240. For particle system objects, for example, the placement of the object may only determine a location of one or more emitters; but the rendering of the objects can involve render output data 244 (e.g., polygon lists, etc.) data received from processor memory 242. Similarly, rendering of animated objects, or otherwise dynamic objects, may involve receiving additional object information from the object libraries 1205 via the object dynamics generator 1240.

For the sake of illustration, embodiments can anchor objects to a viewer position in the future and then use knowledge or estimation of the future path to place them into the scene in advance of the anchor time. The term "scene coordinates" can describe the frame of reference at any moment formed by the view from the moving camera when pointing in the direction of movement. The arranger 120 can create a scene to be viewed at a particular anchor by placing objects at various locations relative to those scene coordinates (e.g., at stage 1204). Each individual placement can be described in the model by a "localToScene" transform matrix that converts local coordinates describing the object into the scene coordinates. When the system determines that the object should be added into the environment, a "localToWorld" transform can be computed by multiplying the localToScene matrix by a "sceneToWorld" transform ($C_{AT}$) (e.g., at stage 1228). For example, a composition can be created by placing objects and/or series of scenes, each associated with respective anchor times, and the objects in the scenes can be added based on predictions of viewpoints at the respective anchor times. In some cases, individual anchor times are specified for each object placement (e.g., as part of stage 1204) based on a most critical viewing time for that object, or the object's association with a scene. For example, a road can be placed as a series of cross sections, and each cross section can be anchored to the viewpoint at the moment the camera passed over it. With such an approach, the road can appear to tracks the motion of the path (e.g., as if the viewer were riding in a vehicle on that road). Instead of creating a sequence of disparate scenes, such implementations assign anchor times and scene coordinates to each individual element, so that the overall environment shapes itself to match the contours of the path (and can adapt to any changes in the path). Embodiments can typically add objects into the environment in advance of their anchor times (e.g., the objects appear in the distance as the path time approaches the anchor time), and the appearance time should be sufficiently in advance so that the object does not suddenly flash into appearance (unless such an appearance is desired). The amount in advance at which objects are inserted can be referred to as an "event horizon," which can be computed as a distance that will be travelled along the path between the current time and the anchor time, as described herein. If the path is being generated or adjusted dynamically, the path position at the anchor time may not be known very far in advance, so that an estimated $C_{AT}$ might be used. The accuracy of estimation may be improved by waiting until the insertion time to set the transforms and by using a shorter event horizon.

Figure 13:
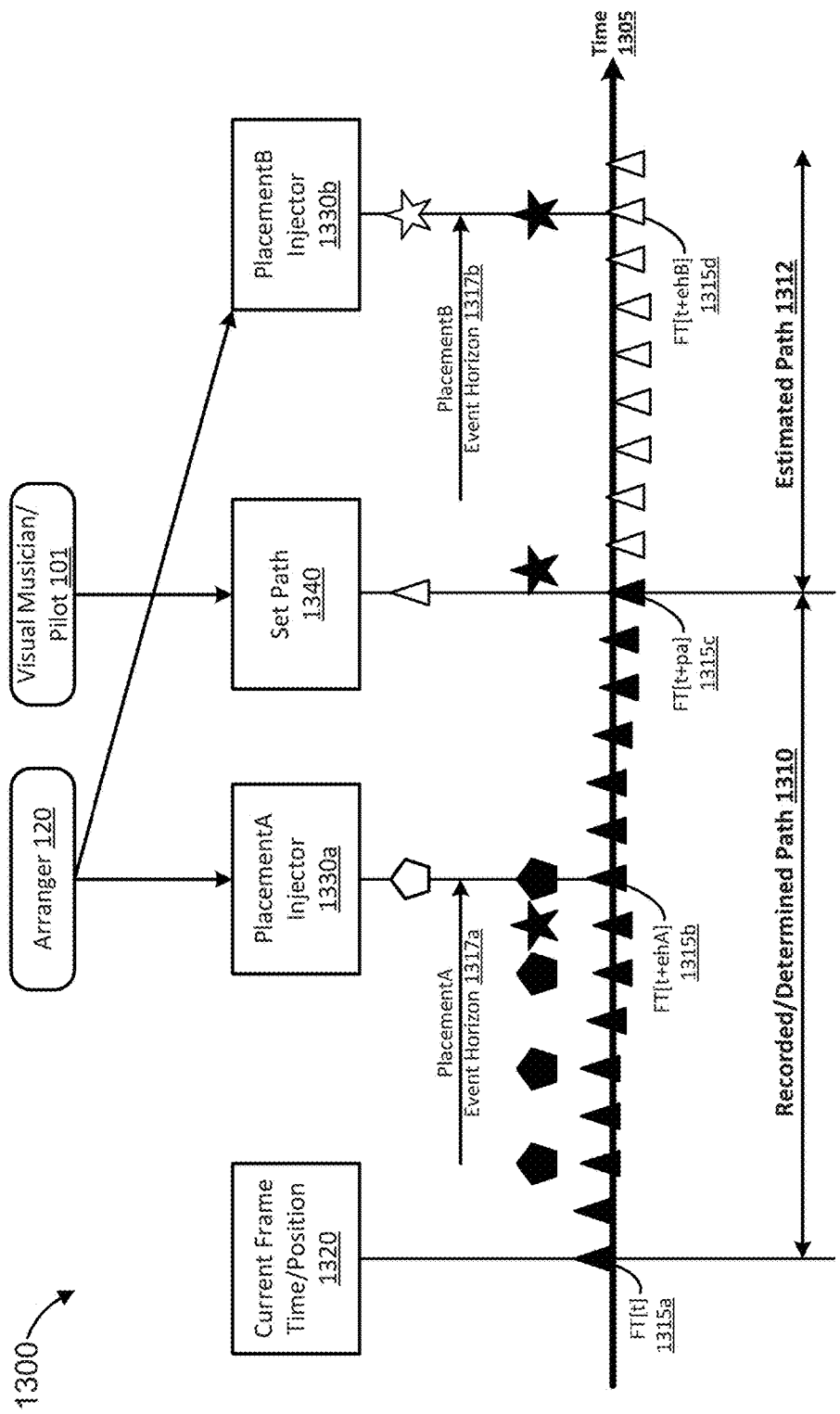
FIG. 13 shows an example visual music environment built on a 4D path-anchored construct, according to various embodiments.

FIG. 13 shows an example visual music environment 1300 built on a 4D path-anchored construct, according to various embodiments. The operation is shown over a time reference 1305 illustrated as beginning at some current frame time 1320. The current frame time 1320 can also correspond to a current position along the compositional space-time of a 4D path. As illustrated, a visual musician 101 is acting as a pilot to effectively drive or play the path over time, thereby setting the path 1340 at each sample time. The visual musician 101 can control the movement of the view position in any suitable manner, such as by steering through world coordinates using an instrument controller 102 (e.g., a six-axis controller, flight joystick, etc.) or by selecting movement patterns from a library. The movements can be controlled in real time, so that the view position changes dynamically in response to the input; or movements can be delayed, so that the view position changes are delayed by an interval. Alternatively, movements can also follow a prerecorded sequence, or can be provided in any other suitable manner.

The path samples are represented by triangles. Though the path samples are illustrated as evenly spaced, different implementations can have adaptive or otherwise changing path recording sample rates. As described above, movement of the view position (i.e., traversal of the path) can give the audience the sensation of moving through the environment (e.g., which may create a sensation analogous to riding on a vehicle). The camera position and direction that is used by the graphics renderer can be expressed as offsets from the current view position (e.g., which may create a sensation analogous to the viewpoint of a passenger in a vehicle moving his head inside the vehicle). For any time (T), the path sample can include (or correspond to) a frame transform 1315 (FT[t]), which is an alternative way to describe the samples making up the $C_{PFT}$ that is generated at 1220. The FT[t] can be a four-by-four matrix used to convert a position in the local or vehicle coordinates into fixed world coordinates. For example, the four-by-four matrix can be a coordinate transform matrix in homogenous coordinates associated with a time index corresponding to the sample time (or sample number, etc.). For a pre-recorded path, the frame transforms 1315 are known for all values of T for the length of the recording. If the path is being recorded (e.g., if movements are being controlled by a visual musician 101), the frame transforms 1315 can be known for a recorded (or predetermined) portion of the path 1310, but the future values of the frame transforms 1315 are not known. In some implementations, some or all future values of the frame transforms 1315 can be estimated as an estimated path 1312.

In the example visual music environment 1300, the visual musician 101 is driving the path (and setting the path 1340) in advance of the current playback frame time 1320 by an amount illustrated as "pa" (e.g., five seconds), so that the position of the viewer and the frame transforms 1315 are known from the current time 1320 (FT[t]) until the path set time (FT[t+pa]) (e.g., and may be estimated for some or all times subsequent to t+pa). Periodic samples of the values for FT[t] can be stored in the database (e.g., in the 4D construct data store 1015 of FIG. 10) and used to interpolate values at times between the samples. In FIG. 13, shaded triangles represent known values of FT, and unshaded triangles represent estimated values of FT (e.g., by assuming the movements will continue in the current direction at the same speed, or by fitting a curve to recent movements, etc.).

The example visual music environment 1300 is shown also to include an arranger 120, who can add object placements into the composition. For example, as described above, the placement of an object can involve associating the object with one or more path-anchored object locators, which can define spatial coordinates and anchor times for anchoring the object to the space-time of the path. The placement can be performed in a local coordinate system, in world coordinates, and/or in any other suitable manner (e.g., as range placement objects, terrain objects, co-flier objects, etc.). In some implementations, a same object can be placed into a scene multiple times at different locations and/or different times.

The illustrated object placements 1330 show "fixed" placement. As used herein, a fixed placement can refer to a placement for which the local coordinate system remains at the same position relative to world coordinates. Each fixed placement has an anchor time, which is the time at which its position relative to the viewer is explicitly defined (e.g., a time deemed visually most important, a time at which the object is closest to the viewer, a time at which the object may exit through a front plane of the frustum, and/or any other suitable time). The placement can be added to the scene in advance of the anchor time, where the amount in advance forms a so-called "event horizon." At that time, the world coordinates can be calculated based on the information available about the future movements of view position.

The example visual music environment 1300 shows two types of placements 1330 ('A' and 'B') being added to the scene by the arranger 120. The 'A' placements 1330a are shown as pentagons that enter the scene in advance of their anchor time by a corresponding event horizon amount (ehA) 1317a. At the current frame time (t) 1320, the viewer can see all the placements of type A with anchor times between the current frame time (t) 1320 and the event horizon time for A (t+ehA). Similarly, the B placements 1330b are shown as stars having a corresponding event horizon amount (ehB) 1317b, which is appreciably longer than ehA 1317a. The B placements are added to the scene in advance of their anchor times by the amount t+ehB; and since ehB 1317b is longer than ehA 1317a, the placements appear to the viewer earlier (and some at more distant locations) relative to the viewer. The event horizon time ehA 1317a is less than the amount that the path is specified in advance (i.e., 'pa', or the time prior to where the path is being set 1340), so FT[t+ehA] is known and the object can appear at the exact offsets specified by its $C_{AT}$ at the anchor time. The event horizon time ehB 1317b is longer than the amount that the path is specified in advance, so that FT[t+ehB] may be unknown, and may be estimated based on the known value FT[t+pa] and the direction and speed at that time. Unexpected turns or speed changes may produce certain errors in estimated placements, so that the object may not appear at the exact offsets specified by its $C_{AT}$ at the anchor time. Such errors can be dynamically corrected in some cases, or permitted in other cases.

Figure 14:
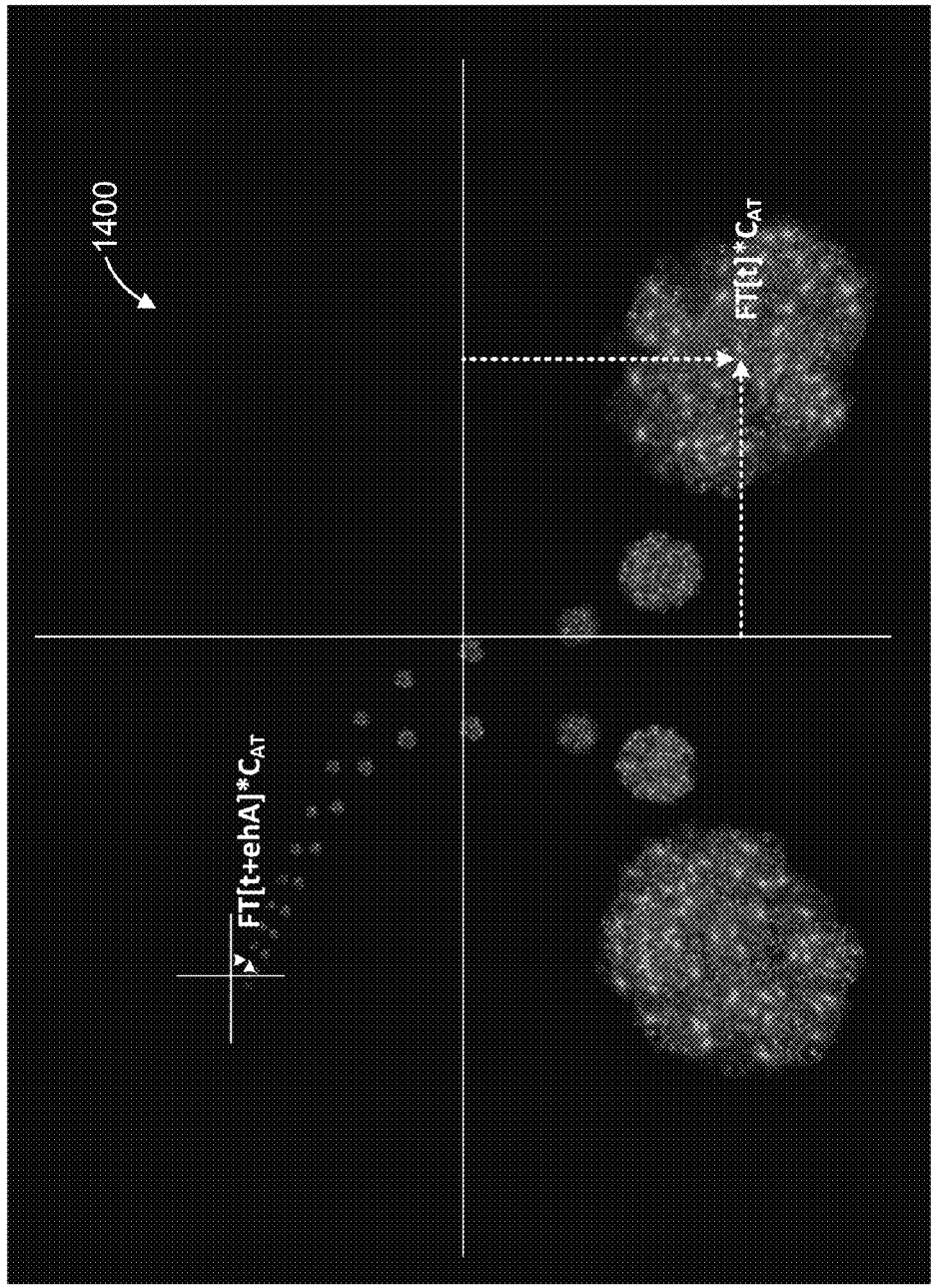
FIG. 14 shows an example image of an object placement, such as one described with reference to FIG. 13 [COLOR]

FIG. 14 shows an example image 1400 of an object placement, such as one described with reference to FIG. 13. A series of rendered 3D objects shaped like balls appear to the left and right underneath a viewer, periodically anchored to and following (and thereby visually manifesting) a path that will be traversed. The two largest ball objects are shown at their respective anchor times, so that their positions are specified using a current frame transform FT[t]. The most distant ball objects in the scene are at the event horizon time (ehA), so that their position is defined by FT[t+ehA]. In some embodiments, the spacing between the ball objects can be determined by polling a placement generator at each playback frame time to see if the viewpoint has advanced by a distance exceeding a predefined spacing since the last instance of that placement was added (e.g., as an example of range placement). If so, a new placement can automatically be inserted into the scene at the defined distance from the previous instance of that placement.

The example of FIG. 14 illustrates a case where ehA<pa, so that the objects are predictably (e.g., accurately) anchored to the path for the entire ehA. For example, such placement can ensure that the viewer remains in the center of the path at a constant height above it, and the ball objects provide a sense of the path as a track or road. With placements like placement B of FIG. 13, where frame transforms are estimated for at least a portion of the event horizon for the object (e.g., ehB>pa), object anchoring may not precisely follow the path (e.g., the view position may appear to wander off the path). If an arranger 120 desires to maintain a tight relationship between the viewer and object placements, event horizon time can be kept with 'pa' (which can be included as a setting of certain embodiments, or can trigger certain alerts to the arranger 120 when not followed). In general, using event horizons that exceed recorded path sample times can tend to cause close objects to appear too much in advance and/or in incorrect locations. Objects that are further away or otherwise are have less critical spatial relationships may typically be added into the scene earlier using estimated frame transforms, and any errors in placement will tend to have less visual impact. Some embodiments thus have an artistic trade-off between giving the pilot fast responses (e.g., low 'pa') versus having a more controlled scene structure relative to the viewer via a longer 'pa' and/or shorter horizon times.

Figure 15:
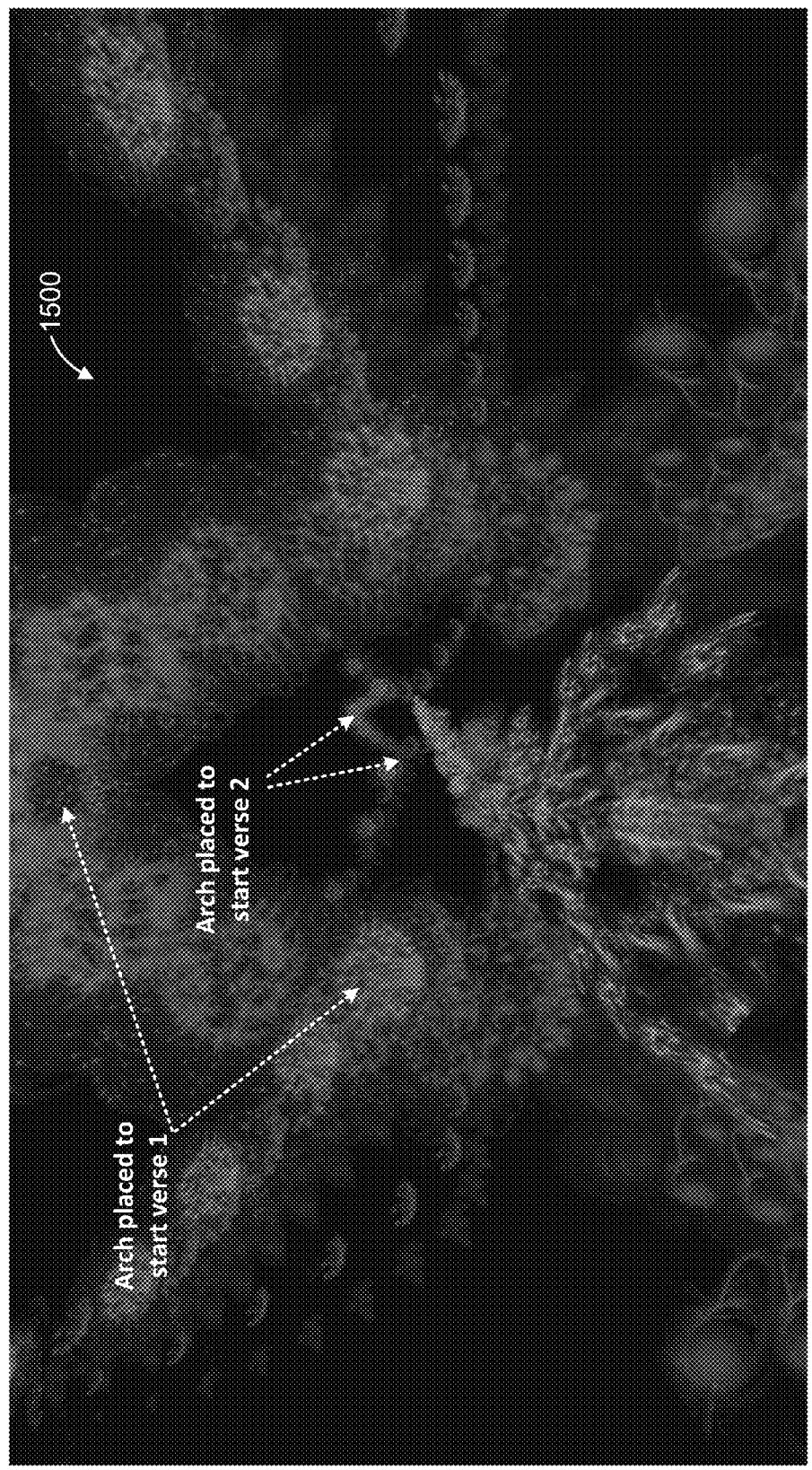
FIG. 15 shows another example image of an object placement [COLOR]

FIG. 15 shows another example image 1500 of an object placement. For example, such an elaborate placement structure can place instances of objects to appear as if the viewer is passing through an arch at the beginning of a verse of a visual music composition. In the image 1500, the viewer is approaching the anchor time of the instance associated with a first verse, while the arch that will be passed at the start of a second verse is already visible in the distance. Unlike the example image 1400 of FIG. 14, where the spacing between placements is at constant distances (e.g., as periodic range placements), the example image 1500 illustrates anchoring of placements tied to compositional structures, such as verses, entry of a particular visual music instrument, etc. (e.g., or tying to timing of accompaniment elements, such as verses, solos, etc. of an accompanying audio track).

Figure 16:
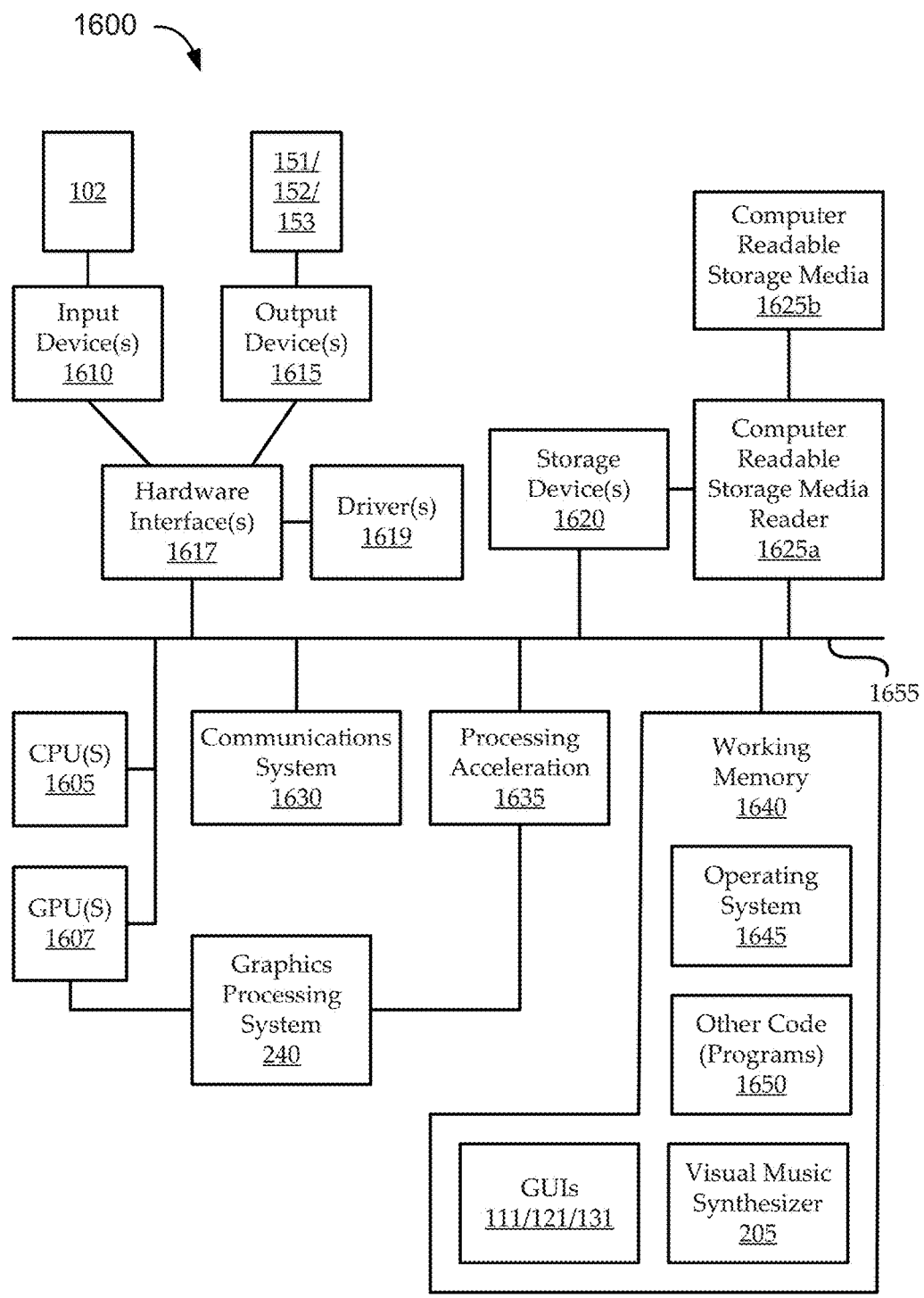
FIG. 16 shows an illustrative computational system for implementing certain functionality of a visual music system, according to various embodiments.

FIG. 16 shows an illustrative computational system 1600 for implementing certain functionality of a visual music system, according to various embodiments. The computational system 1600 can include or perform functionality of components of the visual music system 100 of FIG. 1 and/or functionality of various portions of such a system, such as those described above with reference to FIGS. 2-9. For the sake of simplicity, the computational system 1600 is shown including hardware elements that can be electrically coupled via a bus 1655. However, embodiments of the computational system 1600 can be implemented as or embodied in single or distributed computer systems, in one or more locations, or in any other useful way.

The hardware elements can include a set of (e.g., one or more) central processing units (CPUs) 1605 and/or one or more graphics processing units (GPUs). For example, as described above, visual music synthesizer 205 functionality can be implemented by the CPU(s) 1605, and the graphics processing system 240 functionality can be implemented by the GPU(s) 1607. The CPU(s) 1605 and/or GPU(s) 1607 can be implemented using any suitable processors, and may include (or interface with) one or more processing acceleration 1635 blocks. In some embodiments, the CPU(s) 1605 and/or GPU(s) 1607 include interface languages, protocols, and/or structures for communicating with each other, with one or more input devices 1610, with one or more output devices 1615, with other computational systems, and/or with other structures.

Some embodiments include hardware interface devices 1617 for interfacing between components of the computational system 1600 and input devices 1610 and/or output devices 1615. The input devices 1610 can include instrument controllers 102 and/or standard input controllers (e.g., a mouse, a keyboard, etc.). The output devices 1615 can include virtual reality devices, augmented reality devices, other fully or partially immersive display devices, and/or standard output devices (e.g., a two-dimensional display, a printer, etc.). For example, the output devices can include HMDs 151, domes 152, 3DTVs 153, etc. In some implementations, the hardware interface devices 1617 include drivers 1619 for interfacing with (e.g., converting signals to and/or from) the various input devices 1610 and/or output devices 1615, such as the display drivers 250 described above. Some embodiments can further include a communications system 1630 (e.g., a modem, a network card (wireless or wired), an infra-red communication device, etc.), which can permit data to be exchanged with a network and/or any other computer described above with respect to the computational system 1600.

The computational system 1600 can also include one or more storage devices 1620. By way of example, storage device(s) 1620 can include disk drives, optical storage devices, solid-state storage device such as a random access memory (RAM) and/or a read-only memory (ROM), which can be programmable, flash-updateable and/or the like. In some embodiments, the storage devices 1620 can include or can be in communication with data stores for storing the patches and presets 112, instrument arrangements 122, editing controls and scripts 132, program content 154, and/or any other suitable data, as described above. The computational system 1600 can additionally include a computer-readable storage media reader 1625*a*, which can be connected to a computer-readable storage medium 1625*b*, together (and, optionally, in combination with storage device (s) 1620) comprehensively representing remote, local, fixed, and/or removable storage devices plus storage media for temporarily and/or more permanently containing computer-readable information.

Embodiments of the computational system 1600 further include working memory 1640, which can include RAM and ROM devices as described above. The computational system 1600 can also include software elements, shown as being currently located within a working memory 1640, including an operating system 1645 and/or other code 1650, such as an application program (which can be a client application, web browser, mid-tier application, relational database management system (RDBMS), etc.). In some embodiments, one or more functions of the visual music system can be implemented as application code 1650 in working memory 1640. For example, working memory 1640 (or any other suitable non-transient memory) can store instructions, which, when executed, can cause the set of processors 1605,1607 to perform functions of the visual music synthesizer 205, programming GUI 111, orchestration GUI 121, editing and mixing GUI 131, and/or any other suitable functionality described herein.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A four-dimensional immersive modeling system, the system comprising:
   a four-dimensional (4D) construct data store having stored thereon:
      a path-adaptive coordinate system defined by a sequence of coordinate transform matrices that models a contour of a 4D path, each coordinate transform matrix stored in association with a respective unique time index associable with a path time basis; and a plurality of path-anchored object locators, each defining a three-dimensional (3D) position of an associated one of a plurality of renderable 3D objects at an associated anchor time associable with the path time basis, each of the plurality of renderable 3D objects having an associated event horizon that indicates a distance along the 4D path ahead of the anchor time of the renderable 3D object at which to initially place the renderable 3D object in an immersive virtual environment; and a rendering engine coupled with the 4D construct data store and having, for each of a sequence of playback frame times:

a viewpoint coordinate system (Cv) output computed as a function of a frame coordinate system ($C_{PFT}$) defined according to at least one of the sequence of coordinate transform matrices for which the respective unique time index corresponds to the playback frame time, such that the Cv output indicates a present position along the 4D path for the playback frame time;

an object set output comprising a set of the renderable 3D objects, such that each is one of the plurality of renderable 3D objects for which a distance along the 4D path between the present position and the anchor time of the renderable 3D object is less a distance along the 4D path between the present position and the event horizon of the renderable 3D object, the object set output indicating, for each of the set of the renderable 3D objects, an anchor time coordinate system ($C_{AT}$) defined according to the one of the sequence of coordinate transform matrices for which the respective unique time index corresponds to the anchor time of the renderable 3D object; and a rendered frame output comprising the set of the renderable 3D objects, each rendered in the immersive virtual environment according to a transformed 3D position computed by, for each of the set of the renderable 3D objects, transforming the 3D position of the renderable 3D object into the Cv according to the $C_{AT}$.

2. The 4D immersive modeling system of claim 1, wherein:

the 3D position of each renderable 3D object is defined according to a scene coordinate system;

the rendering system further comprises a transform input defining a transform at least from the scene coordinate system to a camera coordinate system computed as a function of the $C_{PFT}$; and the Cv output is computed as a function of the $C_{PFT}$ by being computed as a function of the transform input.

3. The 4D immersive modeling system of claim 1, further comprising:

a path recording system having a real-time path controller input and a coordinate transform matrix output, the coordinate transform matrix output indicating, at each of a plurality of record times, a present path coordinate system for the record time, wherein, for each of the sequence of coordinate transform matrices, the coordinate transform matrix is computed according to a corresponding present path coordinate system indicated by the coordinate transform matrix output, and the unique time index corresponds to the record time for the corresponding present path coordinate system.

4. The 4D immersive modeling system of claim 3, further comprising:

a human interface device comprising a real-time path controller output generated according to physical interactions with physical control interfaces of the human interface device, the real-time path controller input coupled with the real-time path controller output.

5. The 4D immersive modeling system of claim 1, wherein the object set output further indicates the set of the renderable 3D objects as those of the plurality of renderable 3D objects for which the respective associated anchor times are each within a view frustum for the playback frame time, the view frustum corresponding to a range of the unique time indices of the sequence of coordinate transform matrices.

6. The 4D immersive modeling system of claim 1, wherein the Cv output is further computed according to a path-prospective viewpoint vector pointing from an origin point in the $C_{PFT}$ to a corresponding point in a horizon coordinate system ($C_{HT}$) defined according to the one of the sequence of coordinate transform matrices for which the respective unique time index corresponds to a horizon time that is a predetermined temporal distance subsequent to the playback frame time.

7. The 4D immersive modeling system of claim 1, wherein the anchor time associated with at least one of the plurality of renderable 3D objects is defined according to when the 3D position of the at least one renderable 3D object corresponds to a front frustum.

8. The 4D immersive modeling system of claim 1, wherein at least one of the plurality of renderable 3D objects comprises a particle system having a plurality of virtual particles emitted from an emitter location defined, at each playback frame time, according to the 3D position of the renderable 3D object for the playback frame time.

9. The 4D immersive modeling system of claim 1, wherein:

a travel distance unit is defined according to a difference, with respect to a playback time basis, between sequentially adjacent unique time indices in the path-adaptive coordinate system; and at least one of the plurality of renderable 3D objects is a co-flier object for which the anchor time associated with the at least one renderable 3D object is defined according to a time horizon that is a predetermined fixed number of travel distance units ahead of the $C_{PFT}$.

10. The 4D immersive modeling system of claim 1, wherein at least one of the plurality of renderable 3D objects is a range placement object for which the anchor time associated with the at least one renderable 3D object is defined as a functionally related plurality of anchor times, such that the at least one renderable 3D object is anchored to a plurality of temporal locations along the path-adaptive coordinate system.

11. The 4D immersive modeling system of claim 1, wherein at least one of the plurality of renderable 3D objects is a terrain object for which the 3D position of the at least one renderable 3D object is defined by a vertical axis value and a horizontal axis value that is a function of the vertical axis value.

12. The 4D immersive modeling system of claim 1, further comprising:

an immersive video playback system comprising:

a rendered frame input coupled with the rendered frame output of the rendering engine;

a video display system that outputs the rendered frame input.

13. The 4D immersive modeling system of claim 12, wherein the immersive video playback system further comprises:
- a viewpoint tracker that outputs a real-time orientation of the immersive video playback system,
- wherein the Cv output for each playback frame time is computed further as a function of the real time orientation of the immersive video playback system at the playback frame time.

14. A method for generating four-dimensional path-adaptive immersive video, the method comprising:
- recording a path-adaptive coordinate system in a four-dimensional (4D) construct data store as a sequence of coordinate transform matrices that model a contour of a 4D path, each coordinate transform matrix recorded in association with a respective unique time index associable with a path time basis; and
- defining a plurality of path-anchored object locators, each indicating a three-dimensional (3D) position of an associated one of a plurality of renderable 3D objects at an associated anchor time, each anchor time associable with the path time basis, and each of the plurality of renderable 3D objects having an associated event horizon that indicates a distance along the 4D path ahead of the anchor time of the renderable 3D object at which to initially place the renderable 3D object in an immersive virtual environment, such that, for each of a sequence of playback frame times:
  - a viewpoint coordinate system (Cv) is computable as a function of a frame coordinate system ($C_{PFT}$) defined according to at least one of the sequence of coordinate transform matrices for which the respective unique time index corresponds to the playback frame time, such that the Cv output indicates a present position along the 4D path for the playback frame time;
  - a set of the renderable 3D objects is defined, such that each is one of the plurality of renderable 3D objects for which a distance along the 4D path between the present position and the anchor time of the renderable 3D object is less a distance along the 4D path between the present position and the event horizon of the renderable 3D object;
  - an anchor time coordinate system ($C_{AT}$) is definable for each of the set of the renderable 3D objects according to at least one of the sequence of coordinate transform matrices for which the respective unique time index corresponds to the anchor time of the renderable 3D object; and
  - the set of the renderable 3D objects is renderable for the playback frame time in the immersive virtual environment according to a transformed 3D position computed by transforming the 3D position of the renderable 3D object into the Cv according to the $C_{AT}$.

15. The method of claim 14, wherein the recording comprises receiving output signals from a human interface device generated according to physical interactions with physical control interfaces of the human interface device, and sampling the output signals at a plurality of sample times to generate the sequence of coordinate transform matrices, such that the respective unique time indices correspond to the sample times.

16. The method of claim 14, wherein the set of the renderable 3D objects indicates those of the plurality of renderable 3D objects for which the respective associated anchor times are each within a view frustum for the playback frame time, the view frustum corresponding to a range of the unique time indices of the sequence of coordinate transform matrices.

17. The method of claim 14, wherein defining the plurality of path-anchored object locators comprises defining the anchor time associated with at least one of the plurality of renderable 3D objects according to when the 3D position of the at least one renderable 3D object corresponds to a front plane of a view frustum.

18. A method for rendering four-dimensional path-adaptive immersive video, the method comprising:
- rendering a plurality of immersive three-dimensional (3D) playback frames, each associated with a playback frame time, by, for each playback frame time:
  - computing a viewpoint coordinate system (Cv) as a function of a frame coordinate system ($C_{PFT}$) defined according to at least one of a sequence of coordinate transform matrices for which an associated respective unique time index corresponds to the playback frame time, the sequence of coordinate transform matrices each stored as a path-adaptive coordinate system in a four-dimensional (4D) construct data store, and each stored in association with a respective unique time index associable with a path time basis, such that the sequence of coordinate transform matrices modeling a contour of a 4D path, and the Cv indicates a present position along the 4D path for the playback frame time;
  - defining an anchor time coordinate system ($C_{AT}$) for each of a set of renderable 3D objects according to at least one of the sequence of coordinate transform matrices for which the respective unique time index corresponds to the anchor time of the renderable 3D object, each renderable 3D object associated with a respective path-anchored object locator that indicates a 3D position of the renderable 3D object at an associated anchor time that is associable with the path time basis and indicates an associated event horizon that indicates a distance along the 4D path ahead of the anchor time of the renderable 3D object at which to initially place the renderable 3D object in an immersive virtual environment,
  - wherein the set of renderable 3D objects is defined, for the playback frame time, such that each is one of a plurality of renderable 3D objects for which a distance along the 4D path between the present position and the anchor time of the renderable 3D object is less a distance along the 4D path between the present position and the event horizon of the renderable 3D object;
  - computing, for each of the set of the renderable 3D objects, a transformed 3D position by transforming the 3D position of the renderable 3D object into the Cv according to the CAT; and
  - rendering the set of the renderable 3D objects in the immersive virtual environment according to the transformed 3D position.

19. The method of claim 18, further comprising:
- storing the path-adaptive coordinate system to the 4D construct data store by sampling output signals from an instrument controller that indicate a dynamic path orientation over a plurality of sample times, each sample generating a respective one of the sequence of coordinate transform matrices.

20. The method of claim 18, wherein the rendering comprises:
- for at least one of the plurality of renderable 3D objects, receiving particle characteristics for a plurality of virtual particles emitted from an emitter location defined, at each playback frame time, according to the 3D position of the at least one renderable 3D object for the playback frame time; and rendering the at least one renderable 3D object further according to the received particle characteristics.

21. The 4D immersive modeling system of claim 1, wherein the anchor time associated with at least one of the plurality of renderable 3D objects is represented as a distance traveled along the path.

* * * * *